US010948740B2

(12) United States Patent
Ratcliff et al.

(10) Patent No.: US 10,948,740 B2
(45) Date of Patent: Mar. 16, 2021

(54) HEAD-MOUNTED DISPLAYS HAVING CURVED LENS ARRAYS AND GENERATING ELEMENTAL IMAGES FOR DISPLAYING

(71) Applicant: INTEL CORPORATION, Santa Clara, CA (US)

(72) Inventors: Joshua J. Ratcliff, San Jose, CA (US); Alexey M. Supikov, San Jose, CA (US); Santiago E. Alfaro, Santa Clara, CA (US); Basel Salahieh, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 104 days.

(21) Appl. No.: 15/708,750

(22) Filed: Sep. 19, 2017

(65) Prior Publication Data

US 2019/0086679 A1  Mar. 21, 2019

(51) Int. Cl.
*G02B 3/00* (2006.01)
*G06T 3/00* (2006.01)
*G02B 30/27* (2020.01)
*H04N 13/194* (2018.01)
*H04N 13/344* (2018.01)
*G02B 27/01* (2006.01)
*H04N 13/307* (2018.01)

(52) U.S. Cl.
CPC .......... *G02B 30/27* (2020.01); *G02B 3/0043* (2013.01); *G02B 27/0172* (2013.01); *G06T 3/005* (2013.01); *G06T 3/0093* (2013.01); *H04N 13/194* (2018.05); *H04N 13/307* (2018.05); *H04N 13/344* (2018.05); *G02B 2027/0134* (2013.01)

(58) Field of Classification Search
None
See application file for complete search history.

(56) References Cited

U.S. PATENT DOCUMENTS

| 5,629,765 | A | * | 5/1997 | Schmutz | G01J 9/00 250/201.9 |
| 5,748,375 | A | * | 5/1998 | Yamana | G02B 3/0056 359/621 |
| 6,215,593 | B1 | * | 4/2001 | Bruce | G02B 6/08 359/619 |
| 7,477,451 | B2 | * | 1/2009 | Katz | G02B 3/0037 359/399 |
| 9,983,412 | B1 | * | 5/2018 | Fuchs | G02B 27/0179 |

(Continued)

OTHER PUBLICATIONS

Lanman et al., "Near-Eye Light Field Displays," NVIDIA Research, ACM Transactions on Graphics (TOG)—Proceedings of ACM SIGGRAPH Asia 2013, vol. 32 Issue 6, Article No. 220, Nov. 2013, Published New York, NY, USA, 10 pages.

*Primary Examiner* — Mohammed Jebari
(74) *Attorney, Agent, or Firm* — Hanley, Flight & Zimmerman, LLC

(57) ABSTRACT

An example apparatus for displaying stereo elemental images includes two coupled eyepieces. Each of the two eyepieces also includes a curved screen to display a number of elemental images. Each of the two eyepieces also includes a curved lens array concentrically displaced in front of the curved screen to magnify the elemental images. Each of the number of elemental images is magnified by a different lens in the curved lens array.

25 Claims, 18 Drawing Sheets

(56) References Cited

U.S. PATENT DOCUMENTS

| | | | | |
|---|---|---|---|---|
| 2002/0181115 A1* | 12/2002 | Massof | ............... | G02B 27/017 359/630 |
| 2004/0108971 A1* | 6/2004 | Waldern | ............. | G02B 27/0093 345/8 |
| 2007/0097277 A1* | 5/2007 | Hong | ................. | G02B 27/0172 349/11 |
| 2009/0128899 A1* | 5/2009 | Newell | .................... | G02B 7/06 359/399 |
| 2012/0113097 A1* | 5/2012 | Nam | ................... | H04N 13/383 345/419 |
| 2014/0340390 A1* | 11/2014 | Lanman | .................. | G06T 15/04 345/419 |
| 2015/0049390 A1* | 2/2015 | Lanman | ............. | G02B 27/0075 359/622 |
| 2017/0102549 A1* | 4/2017 | Lee | .................... | G02B 27/0179 |
| 2017/0115489 A1* | 4/2017 | Hu | ..................... | G02B 27/0172 |
| 2017/0171533 A1* | 6/2017 | Benitez | ............... | H04N 13/383 |
| 2018/0039069 A1* | 2/2018 | Huang | .................. | G02B 25/04 |
| 2018/0052309 A1* | 2/2018 | Lee | ..................... | G02B 3/0006 |

\* cited by examiner

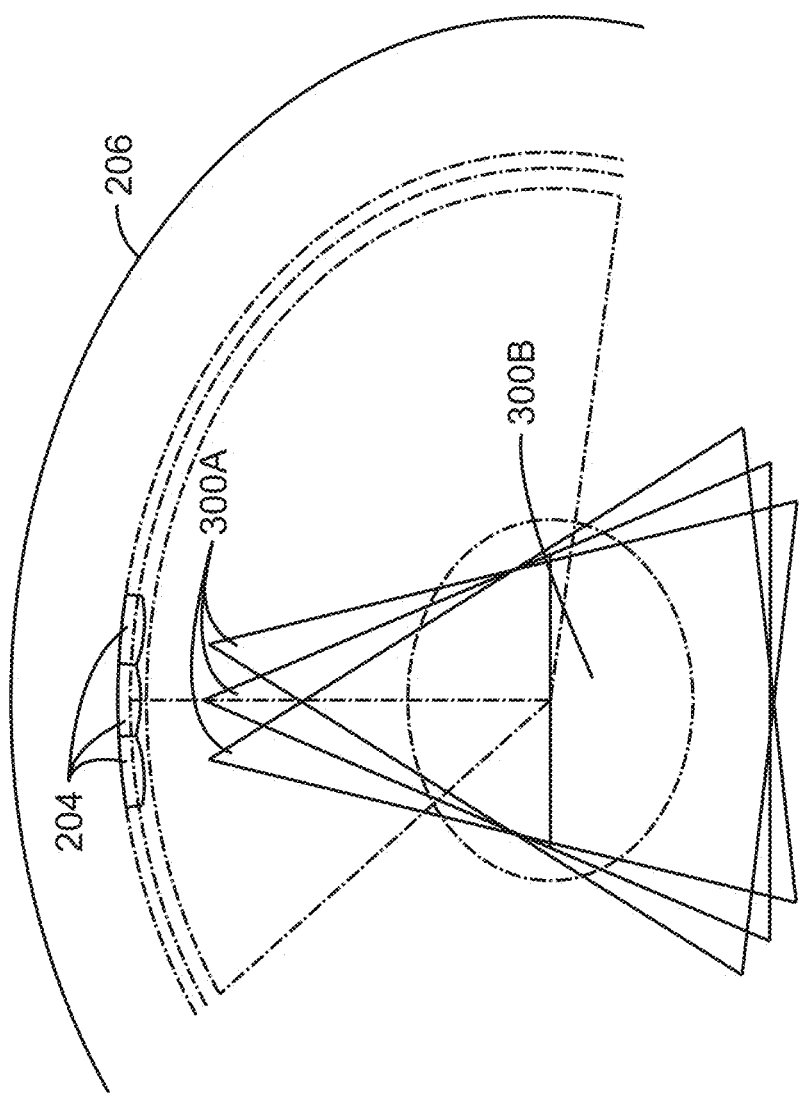
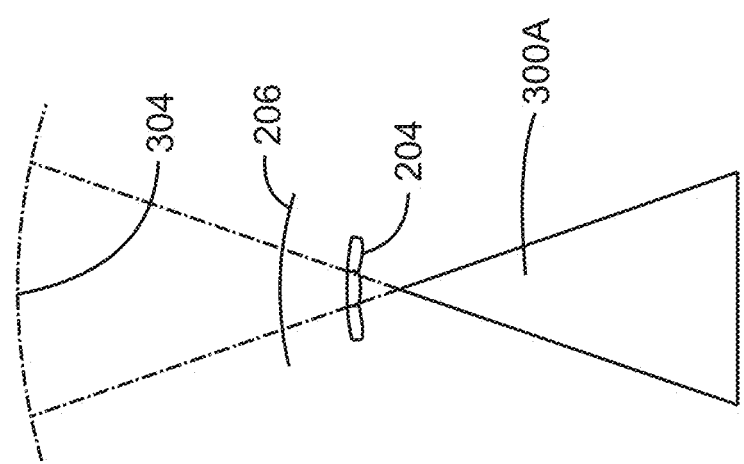
FIG. 3B
FIG. 3A

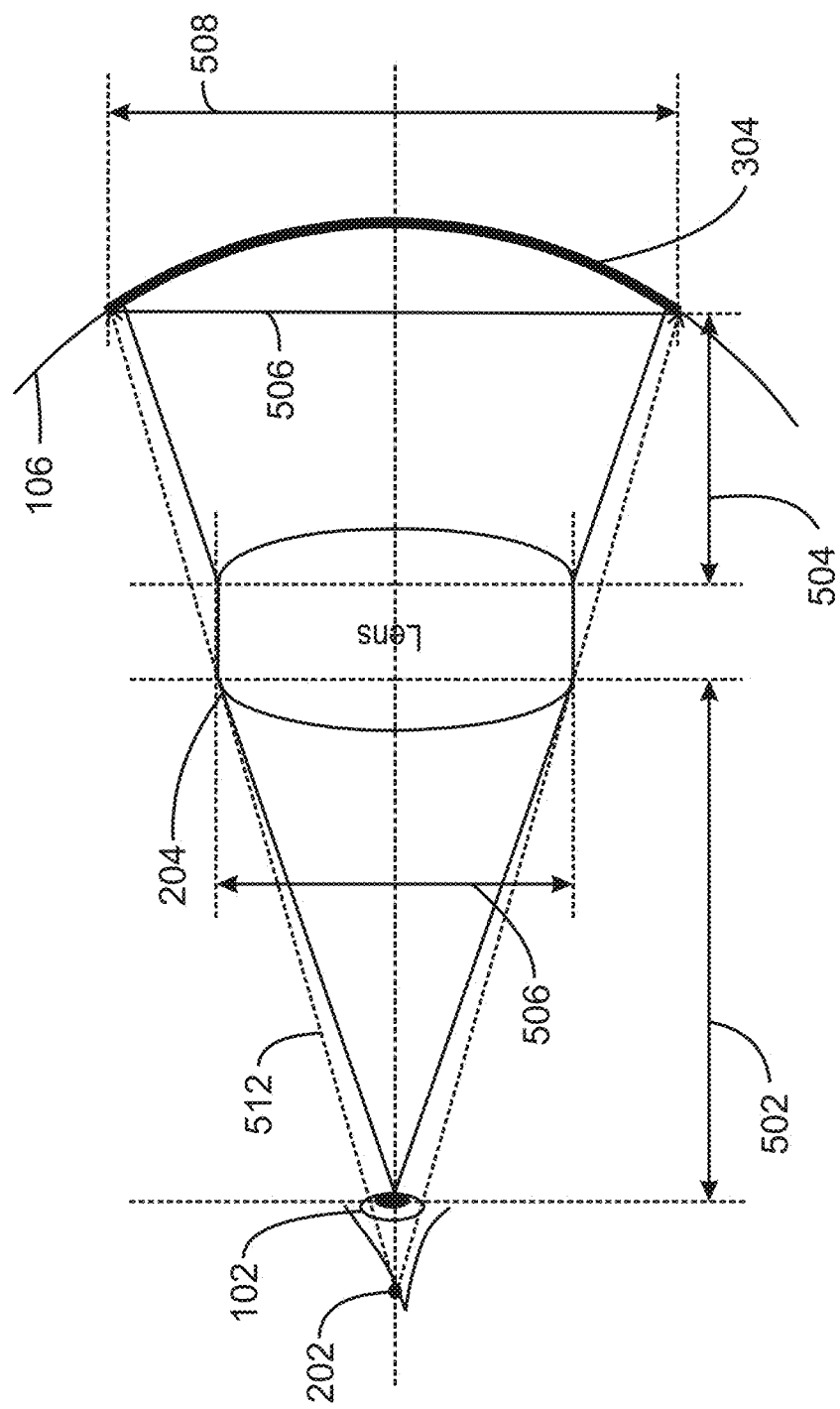

600A

600B

800

900

1100

| Eye Rot. 1302 | 0° | 7.25° | 14.27° | 20.88° | 26.96° | 32.45° |
|---|---|---|---|---|---|---|
| Identical 1304 | OBJ: 0.0000 mm<br>RMS radius: 12.510<br>1308<br>400.00 | OBJ: 6.6328 mm<br>RMS radius: 51.921<br>1310<br>400.00 | OBJ: 13.22 mm<br>RMS radius: 236.898<br>1312<br>2000.00 | OBJ: 19.64 mm<br>RMS radius: 842.719<br>1314<br>4000.00 | OBJ: 26.16 mm<br>RMS radius: 2331.10<br>1316<br>10000.00 | OBJ: 32.50 mm<br>RMS radius: 1006.74<br>1318<br>4000.00 |
| Heterogeneous 1306 | OBJ: 0.00 mm<br>RMS radius: 12.445<br>1320<br>200.00 | OBJ: 6.67 mm<br>RMS radius: 23.239<br>1322<br>200.00 | OBJ: 12.92 mm<br>RMS radius: 29.562<br>1324<br>200.00 | OBJ: 19.05 mm<br>RMS radius: 29.463<br>1326<br>200.00 | OBJ: 24.75 mm<br>RMS radius: 25.471<br>1328<br>200.00 | OBJ: 31.35 mm<br>RMS radius: 23.260<br>1330<br>200.00 |

HEAD-MOUNTED DISPLAYS HAVING CURVED LENS ARRAYS AND GENERATING ELEMENTAL IMAGES FOR DISPLAYING

BACKGROUND

Head-mounted displays (HMDs) are used to present virtual reality scenes. For example, HMDs may display a pair of images rendered for each eye that may be refreshed with movement of the head to present users with a three-dimensional virtual environment.

BRIEF DESCRIPTION OF THE DRAWINGS

FIG. 3A is a diagram illustrating an example viewing zone for a single lens;

FIG. 3B is a diagram illustrating an example compound viewing zone for three lenses;

FIG. 5 is a diagram illustrating an example thick lens model;

FIG. 13 is a diagram comparing example spot diagrams of field points aligned with a fovea of a rotated eye for identical and heterogeneous lens designs;

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Figure 1:
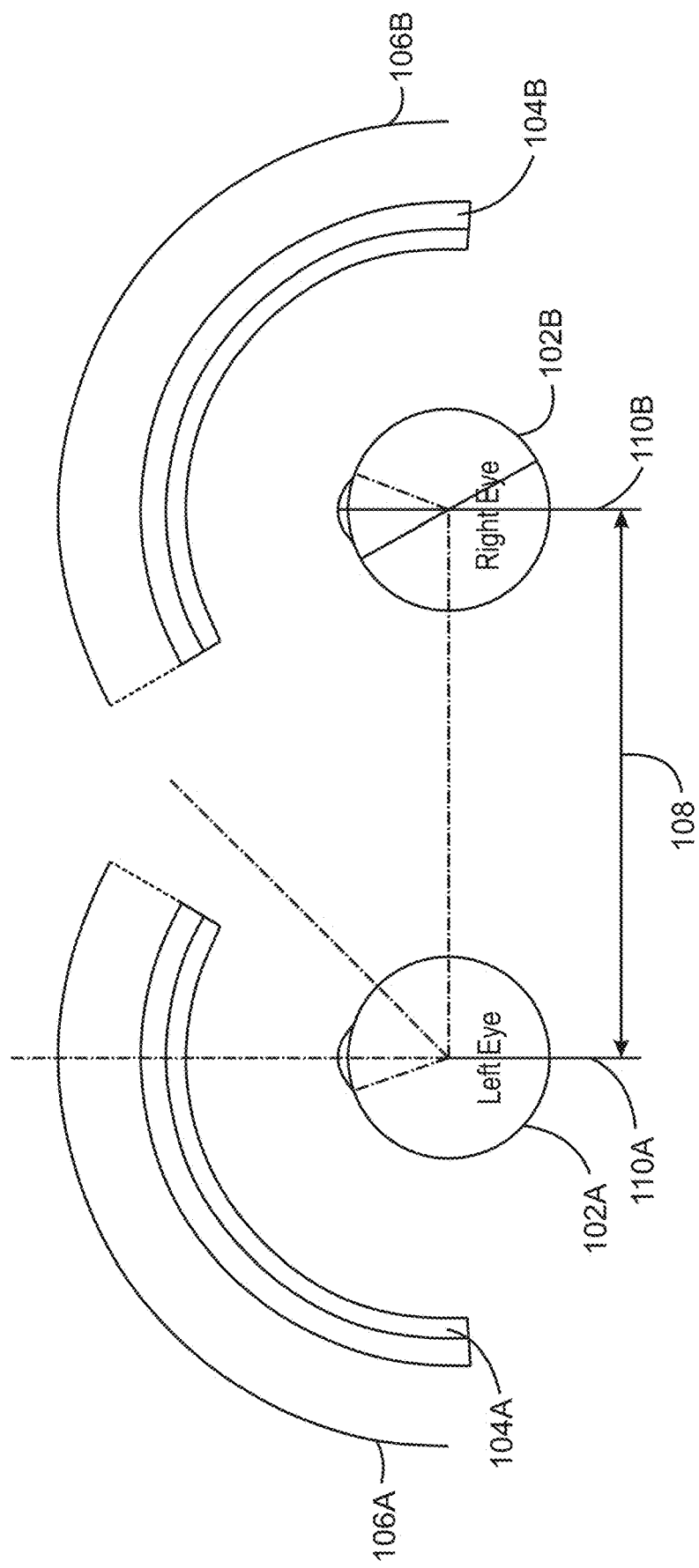
FIG. 1 is a diagram illustrating an example head-mounted display that includes a curved lens array.

As discussed above, Head-mounted displays (HMDs) can be used to present virtual reality scenes. However, due to the limitations of conventional optics such HMDs may be bulky in design and may exhibit poor visual performance towards the periphery of their displays: the effective resolution degrades, geometric distortions and color aberrations become more prominent. In addition the effective FOV of the conventional HMD is limited by the optics.

The present disclosure relates generally to idea to an improved HMD using curved heterogeneous or homogeneous lens array as the optical element, and techniques for rendering and presenting virtual reality images for the improved HMD. Specifically, the techniques described herein include the use of HMDs with curved lens arrays, and an apparatus, method and system for rendering and presenting virtual reality images via the HMDs with curved lens arrays. An example apparatus includes two coupled eyepieces. For example, the coupled eyepieces may be a left and right point of view for each eye of a user. The apparatus may be a head mounted display. Each of the eyepieces includes a curved screen to display a plurality of elemental images. As used herein, elemental images are subsets of images displayed via a screen of each eye piece in an HMD. Each of the eyepieces also includes a curved lens array concentrically displaced in front of the curved screen to magnify the elemental images. Each of the plurality of elemental images is magnified by a different lens in the curved lens array.

In addition, the present disclosure includes a method for rendering virtual reality images, including receiving an image to be presented and a virtual distance from the eyes of a viewer. The method also includes rendering a stereo view of the image for each of the eyes at a virtual surface located at the virtual distance. The method further includes mapping pixels for each stereo view from the virtual surface to elemental images of a per-eye display using a per-lens projection model. The method includes pre-warping the elemental images based on a per-lens distortion model to compensate for a lens distortion. The method also further includes sending pre-warped elemental images to a head mounted display to be displayed.

Using the curved lens array and techniques described herein thus enable a thinner form factor for virtual reality HMDs as compared to currently flat screen HMDs with conventional optics. In typical design, a flat OLED/LCD display is positioned behind the optical element, at some distance slightly less than its focal length. This generates a virtual image appearing at a distance much farther than the actual display. For example, VR HMDs may be inherently bulky due to the long optical paths required by traditional refractive optic design acting as magnifying lenses. This bulkiness may only worsen as field-of-view (FOV) increases. To roughly measure how bulky a VR headset must be, one can simply calculate a 'total thickness' at any point from the user's face. For example, the total thickness may be the sum of the face-to-lens distance, the lens thickness, and the spacing from lens-to-display. For many systems with decently large lenses for FOV, this thickness can be up to 100 mm or more, not including housing and electronics. The techniques described herein overcome the long optical path required of traditional VR optics by replacing the bulky main lens of relatively long focal length with an array of smaller lenses of much smaller focal length. Moreover, using curved lens array and techniques described herein enable a very large (>180 degree) FOV and a dramatically thinner design contoured to the human face, while maintaining acceptable resolution. In addition, the techniques described herein can use injection-moldable polymer optics and commodity-cost OLED panels, thereby reducing complexity and cost. Moreover, the method for rendering virtual reality images may enable elemental images to be computed quickly and accurately in real-time low latency applications. For example, it can be implemented as a post-processing mapping of pixels rendered using conventional 3D graphics methods from planar surfaces to elemental images, thus adding a very little cost to the rendering cost for conventional stereo HMD. Such a mapping can use a plurality of methods, such as precomputed look-up tables for various eye conditions, or computing inexpensive mapping function comprising of superposition of projective transformation and distortion pre-compensation warping, or combination of both. In some examples, eye pupil tracking may also enable real-time measurements of eye parameters, hence, real-time correction of displayed elemental images so that virtual rendered images remain fused and sharp at any eye condition.

FIG. 1 is a diagram illustrating an example head-mounted display that includes a curved lens array. The example head-mounted display is referred to generally by the reference number 100 and can be implemented in the computing device 1600 below in FIG. 16 using the method 1500 of FIG. 15 below.

The example head-mounted display 100 is shown with respect to two eyes of an example user, including a left eye 102A and a right eye 102B. The head-mounted display 100 includes two separate curved screens 106A, 106B, associated with the left eye 102A and right eye 102B, respectively. The curved screens 106A, 106B are associated with curved lens arrays, 104A and 104B, respectively. An inter-pupillary distance is indicated by an arrow 108 between pupillary axes 110A and 110B. For example, the inter-pupillary distance may be approximately 2.78 inches or 70.61 millimeters.

As shown in FIG. 1, the head-mounted display 100 may present a pair of virtual reality images or video to the eyes 102A, 102B of a user. For example, the VR images or video can be rendered for presentation on the head-mounted display 100 as discussed below. As can be seen in FIG. 1, when viewed together through a head mounted display, the curved screens 106A and 106B can present an image with a view angle of 180 degrees. Thus, a high quality image may be presented to the periphery of eyes 102A, 102B. Such a high quality image provided to the peripheral vision may improve user experience by making virtual reality images appear more realistic to the eyes 102A, 102B.

In some examples, each of the curved screens 106A and 106B may display individual elemental images as described in greater detail with respect to FIG. 2 below. Likewise, each of the curved lens arrays 104A and 104B may be composed of any number of lenses. For example, each individual elemental image may be associated with a particular lens of the lens arrays 104A and 104B. The curved lens arrays 104A and 104B can magnify the individual elemental images to be projected into eyes 102A and 102B. Thus, a smaller focal length than traditional HMDs can be used, reducing bulk and weight of the HMD. Therefore, there are some distinct advantages to curving the lens array, either in part or entirely, for each eye. In some example, using curved lens arrays may result in improved off-axis performance. For example, for a cylindrical curve, a user may be approximately viewing all central lenses across the horizontal direction as an on-axis lens. This may provide an ultra-wide FOV with very sharp imaging along the entire curvature and not just along the central axis. For example, the FOV may be more than 180 degrees. In some examples, a freeform lens refinement may be used for the vertical dimension. For example, lenses in the vertical dimension can be modified with shapes based on their location to improve sharpness. In some examples, the curved lens array and the curved screen may include a spherical curvature curved in two dimensions to reduce off-axis aberrations.

Thus, using curved lens arrays may improve industrial design of HMDs. For example, using curved lens arrays opens many new opportunities to design a slim device with a face-hugging form factor that may be impossible with current HMD's. As used herein, a lenslet refers to a small lens that is part of a lens array, also referred to as a lenslet array, including many other lenslets. In some examples, the curved lens array may be a planar surface that has been flexed or thermo-formed into a curved design. For example, the planar surface may include a planar array of lenses, with each of the lenses having a one or more different shapes. Thus, the planar array of lenses may be initially manufactured as a planar surface and then formed using any suitable technique into a curved design for ease of manufacture.

In some examples, the distance between the lenses in the curved lens array and the display can be adjusted for near-sighted users to enable them to see the display without glasses. In some examples, adjusting for near-sightedness may include adjusting the lens-to-display distance while maintaining concentricity and changing the curvature of the display to match the adjusted distance. For example, the curved screen and the curved lens array can be mechanically paired for changing the lens array-to-display spacing while preserving concentricity. In some examples, a mechanically flexible organic light emitting diode (OLED) display may be used for the curved screens 106A and 106B with a fixed curved lens array. In some examples, both the curved lens array and the curved screen can be mechanically flexible. For example, having both the curved lens array and the curved screen flexible may allow reshaping of the design while preserving lens-to-display concentricity. In some examples, one or more lenslets of the curved lens array can be electrically focus-tunable or dynamically switchable. For example, focus-tunable lenses can change focal length within the certain range continuously depending on an applied voltage or current pattern. Switchable lenses can have several discrete focal lengths that can be selected electronically. In some examples, the focus-tunable lenses or the dynamically switchable lenses can be liquid crystal based, membrane based, or electro-wetting based. The use of electrically focus-tunable or dynamically switchable lenslets may enable either multi-plane or volumetric virtual rendering. Multi-plane or volumetric virtual rendering may be used for eliminating a convergence-accommodation conflict.

In some examples, the curved lens array may be replaceable. For example, the curved lens array may include a manually-operated design that enables the user to replace the lens array with another lens array. A replaceable lens array may allow for prescription lenses, such that users with visual impairment can look directly through a customized corrected VR without eyeglasses while maintaining the thin-format of the present design. Thus, users that normally wear prescription glasses may not need to wear any glasses with curved lens arrays for improved eyeglass-free visual comfort.

The diagram of FIG. 1 is not intended to indicate that the example head-mounted display 100 is to include all of the components shown in FIG. 1. Rather, the example head-mounted display 100 can be implemented using fewer or additional components not illustrated in FIG. 1 (e.g., additional layers, filters, lens elements, dimensions, etc.).

Figure 2:
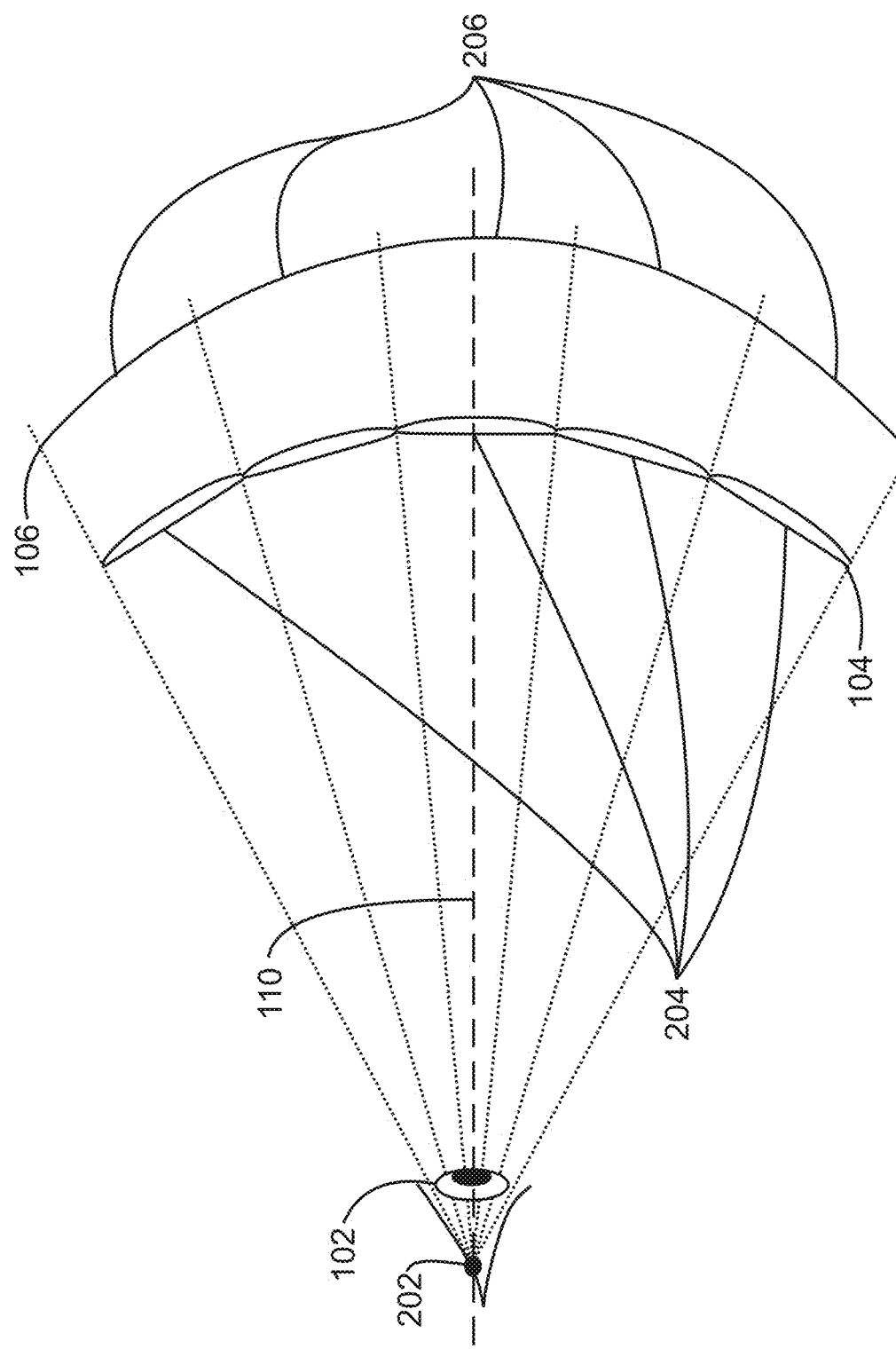
FIG. 2 is a diagram illustrating an example curved virtual reality display for one eye.

FIG. 2 is a diagram illustrating an example curved display for one eye. The example curved display is referred to generally by the reference number 200 and can be implemented in the computing device 1600 below in FIG. 16 using the method 1500 of FIG. 15 below.

The example of FIG. 2 includes similarly numbered elements from FIG. 1. For example, FIG. 2 shows a curved screen 106 and lens array 104 curved along the cylinders concentric with an eye center 202 of the viewer's eye 102. For example, the eye center 202 may correspond to the fovea of the eye. The fovea, or fovea centralis, is a small, central pit composed of closely packed cones in the center of the retina of the eye and is responsible for sharp central vision. The curved display 200 includes a lens array 104 with a number of lenses 204, also referred to herein as lenslets, and a curved screen 106. The curved screen 106 is divided into a number of elemental images 206. For example, each elemental image 206 may be rectangular region associated with a particular lens 204 in the lens array 104. Each elemental image 206 may be centered horizontally with the correspondent lens 204.

A pupillary axis 110 is shown extending from the eye center 202 through the pupil of the eye 102 and towards the middle of the curved screen 106.

As shown in FIG. 2, the curved screen 106 may be logically divided into rectangular regions, referred herein as elemental images 206, to be viewed by the eye 102 through a number of lenses 204. Each elemental image 206 may be magnified by a single lens 204 of the curved lens array 104. For example, each elemental image 206 may be magnified by a lens such that a viewer looking through that lens may see a magnified version of the image appearing to be at the virtual distance from the lens. Together, the elemental images 206 may create a rectangular grid on the curved screen 106. For example, the elemental images 206 may have been rendered using any of the methods 1300 or 1500 described below. As shown using the pupillary axis, light emitted by each of the elemental images 206 of the curved screen 106 pass through one of the lenses 204 before reaching the pupil of the eye 102. In some examples, the lenses 204 may be heterogeneous. For example, the lenses 204 may have a different size, shape, curvature, etc. In some examples, the lenses 204 may be free form, or having a surface that is not spherical in shape. For example, the shape of the lenses 204 can be electromechanically adjustable. As also shown in FIG. 2, when the screen is curved, the associated elemental images 206 may also be rendered for the curved surface.

The diagram of FIG. 2 is not intended to indicate that the example curved virtual reality display 200 is to include all of the components shown in FIG. 2. Rather, the example curved virtual reality display 200 can be implemented using fewer or additional components not illustrated in FIG. 2 (e.g., additional lenses, screens, elemental images, filters, dimensions, etc.).

In addition, although FIGS. 1 and 2, in addition to Figs. below, show curving very close to cylindrical surfaces concentric to the eye rotation center 202, in some examples, other curved surfaces may be used with similar design principles. First, the use of other curved surfaces may include selection of ideal eye position(s). Second, the use of other curved surfaces may include allocating elemental images 206 to increase use of the surface of the screen 106. Third, the use of other curved surfaces may include selecting design parameters for best desired resolution and tolerable viewing zone size.

FIG. 3A is a diagram illustrating an example viewing zone for a single lens. The example viewing zone is referred to generally by the reference number 300A and can be implemented in the computing device 1600 below in FIG. 16 using the method 1500 of FIG. 15 below.

The example viewing zone 300A is shown with respect to one lens 204 of a lens array. The viewing zone 300A is associated with the lens 204 and an associated elemental image 206. The viewing zone 300A is also associated with a virtual image 304 that can be seen through lens 204.

As shown in FIG. 3A, the virtual image 304 may be seen within viewing zone 300A when viewing elemental image 206 through the lens 204. The lens 204 in the array may act as a simple magnifier producing the virtual image 304 of its corresponding elemental image 206 at distance defined by the spacing and lens properties. In some examples, the lens properties can be adjustable, such as with free form lenses. The viewing zone 300A of a single lens 204 may thus be a region in space where the viewer can see only the correspondent elemental image pixels through the aperture of the corresponding lens 204. For example, the viewing zone 300A may be an area where pixels from other elemental images are not visible through the given lens 204. In some examples, the shape of the viewing zone 300A may be defined by lens properties, elemental image size and mutual position of the lens and elemental image. For example, lens properties may include focal length, aperture, etc.

In some examples, a minimum viewing zone size for a thin HMD can be calculated based on an eye radius and eye pupil entrance. In some examples, the viewing zone may have a box width based on a distance for an eye rotation center. For example, for static designs, the eye relief and shape of the viewing zone may allow for an approximately 13 millimeter eye box width at 6 millimeters from the eye rotation center. The 6 mm may be calculated based on a 13 millimeter eye radius minus a seven millimeter eye pupil entrance. In some examples, an HMD may include an eye position tracker to track the position of the eyes of a user and a viewing zone comprising a box width at each pupil based on a distance from an eye rotation center or an error of margin of the eye position tracker. For example, the box width at the pupil may be large enough to contain the pupil plus an error margin of the tracker. In some examples, the box width can be parameterized as a box width at the center of rotation. In some examples, an apparatus can be designed for a viewing zone with the pupil size of the user taken into account plus the error margin. For example, the pupil size may be five or six millimeters. The error margin may be based solely on the tracker. In some examples, if eye position tracking is available, then the viewing zone size at the intended eye relief can be reduced to either the size of an average adult pupil or the error margin of the eye pupil tracker, whichever is greater. For example, the average adult pupil size may be approximately five to six millimeters. Thus, an HMD with eye tracking may use a viewing zone of at least a greater of 5 millimeters box width at 6 millimeters from an eye rotation center or an error of margin of the eye position tracker.

The diagram of FIG. 3A is not intended to indicate that the example viewing zone 300A is to include all of the components shown in FIG. 3A. Rather, the example viewing zone 300A can be implemented using fewer or additional components not illustrated in FIG. 3A (e.g., additional lenses, elemental images, virtual images, etc.).

FIG. 3B is a diagram illustrating an example compound viewing zone for three lenses. The example compound viewing zone is referred to generally by the reference number 300B and can be implemented in the computing device 1600 below in FIG. 16 using the method 1500 of FIG. 15 below.

The example compound viewing zone 300B is shown with respect to one lens 204 of a lens array. The compound viewing zone 300B includes a number of overlapping viewing zones 300A, with associated lenses 204.

As shown in FIG. 3B, the compound viewing zone 300B may be an area of intersection of three viewing zones 300A. In some examples, a resolution of a display can be defined as the total number of pixels visible through all lenses 204 across the display. Thus, the number of elemental image pixels visible through any single lens 204 can be used to estimate the resolution. The number of elemental image pixels visible may also depend on how close the viewer's eye is assuming the eye remains within the viewing zone. For example, the closer the eye is to the lens, the larger the field of view (FOV) through that lens, the more pixels the eye can see. Thus, there is a direct tradeoff between eye relief, viewing zone size, and the number of pixels visible to the observer. In some examples, these three factors can be balanced to achieve an improved design. For example, an eye relief limit may be based on a shape of a viewing zone of the HMD.

The FOV may be the angle through which the viewer is able to see the display. In some examples, increases in FOV do not increase the device thickness. Rather, additional lenses, and display surface, may be added to the perimeter of the design without increasing device thickness.

The diagram of FIG. 3B is not intended to indicate that the example compound viewing zone 300B is to include all of the components shown in FIG. 3B. Rather, the example compound viewing zone 300B can be implemented using fewer or additional components not illustrated in FIG. 3B (e.g., additional viewing zones, lenses, etc.).

Figure 4:
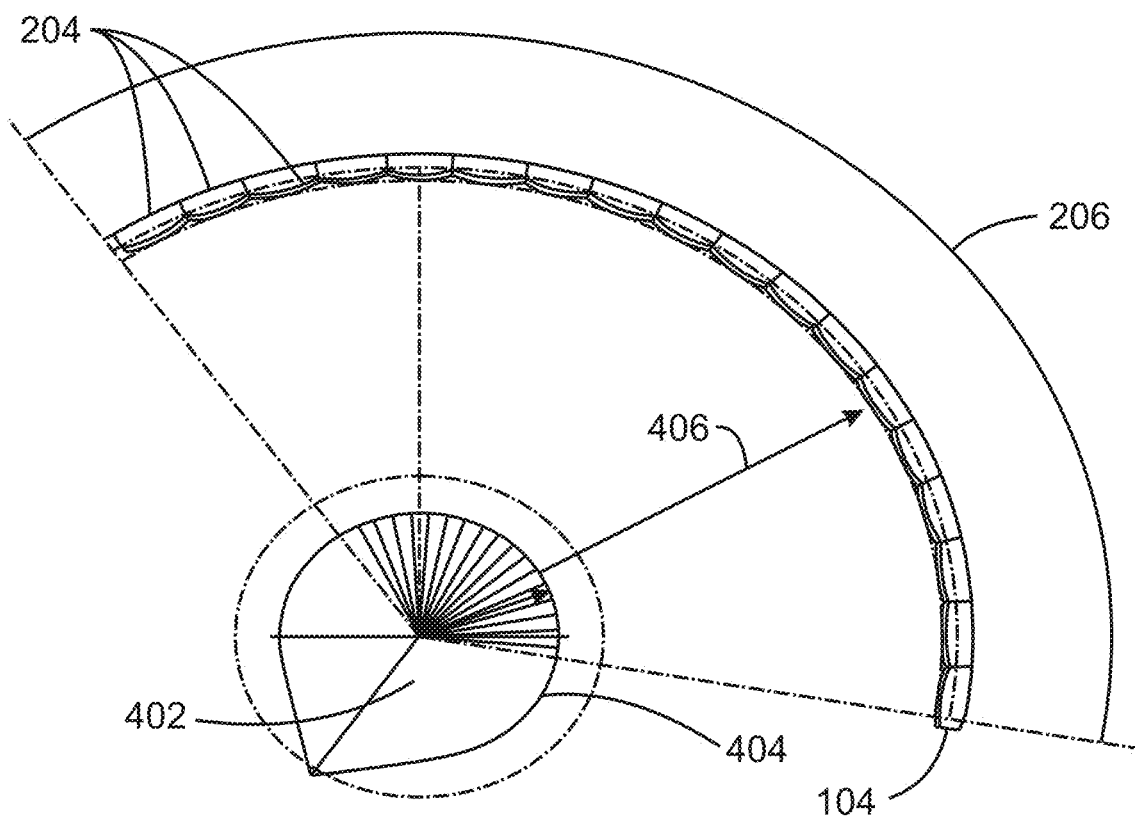
FIG. 4 is a diagram illustrating an example compound viewing zone for a larger number of lenses.

FIG. 4 is a diagram illustrating an example compound viewing zone for a larger number of lenses. The example compound viewing zone is referred to generally by the reference number 402 and can be implemented in the computing device 1600 below in FIG. 16 using the method 1500 of FIG. 15 below.

FIG. 4 shows the example compound viewing zone 402 with respect to 18 lenses 204 of a lens array 104. The example of FIG. 4 also includes an associated curved screen 206. A boundary line 404 of the compound viewing zone 402 indicates a boundary beyond which an eye is not allowed to move. A minimal eye relief 406 is indicated by an arrow.

As shown in FIG. 4, for a larger number of lenses 204 the distance between viewing zone 400 and lens array 104 may be bounded by the boundary 404 of the compound viewing zone 402 that is closest to the eye and gives a good estimate for minimum eye relief 406. For example, for a concentric cylindrical design, the minimum allowable eye relief 406 may be defined by a distance between the center of rotation of the eye and the boundaries of the viewing zones making up the compound viewing zone 402.

Changing the viewing zone implies changing the eye relief and the eye box shape. In some examples, the shape of the compound viewing zone 402 may be taken into account when optimizing for the system parameters, including eye relief and eye box shape, among other parameters. For example, changing the lens aperture, the focal length, or the lens-screen spacing may affect the shape of viewing zone and number of pixels visible through a given lens. In some examples, when number of lenses is small, the exact shape of the viewing zone can be used to reduce minimum possible eye relief and thus increase the perceived resolution of the system by allowing smaller eye relief. Eye relief is distance from the last surface of an eyepiece within which a user's eye can obtain a full viewing angle.

In some examples, a minimum allowable eye relief 406 can be calculated based on the shape of the viewing zone 402. For example, with designs having fewer lenses and thus a smaller combined FOV, the intersection of the viewing zones may form a different shape than the approximate cylinder shown above. In some examples, if an exact shape of the viewing zone is known, then the minimum possible eye relief can be reduced to increase the perceived resolution of the system. In some examples, a human retina-matched design may be used. For example, ordinarily, if an eye is too close to the display, a 'broken image' may be observed. In a finely-tuned human retina-matched design, these image formation failures can be hidden in the peripheral vision of the human retina. Since human vision has very poor resolution beyond a small angle, a user may not notice the image formation failures in peripheral vision.

The diagram of FIG. 4 is not intended to indicate that the example compound viewing zone 400 is to include all of the components shown in FIG. 4. Rather, the example compound viewing zone 400 can be implemented using fewer or additional components not illustrated in FIG. 4 (e.g., additional lenses, viewing zones, etc.).

FIG. 5 is a diagram illustrating an example thick lens model. The example thick lens model is referred to generally by the reference number 500 and can be implemented in the computing device 1600 below in FIG. 16 using the method 1500 of FIG. 15 below.

The example thick lens model 500 is shown with respect to one lens 204 of a lens array. A thick lens, as used herein, refers to a lens with a thickness measured by a distance along the optical axis between the two surfaces of the lens that is not negligible compared to the radii of curvature of the lens surfaces. The thick lens model 500 includes an eye center 202 of an eye 102 looking through a lens 204 at a curved screen 106. A distance 502 between the eye 102 and lens 204 is indicated by an arrow. A distance 504 between the lens 204 and a chord 506 intersecting the curved screen 106 is indicated by another arrow. A length 508 of the chord 506 is indicated by an arrow. A width 510 of the lens 204 is also indicated by an arrow. A screen surface radius 512 indicates the distance from the eye center 202 to the curved screen 106.

As shown in FIG. 5, the thick lens model 500 may be used for computing corrections for screen curving. For example, spacing values and elemental image size may be corrected according to thick lens equations and measured with respect to two principal planes. In some examples, the length 508 of the chord 506 can be equal to the size of an elemental image associated with the lens 204 to correct for screen curving. In some examples, a parameter optimization may be performed on lens pitch, effective resolution, FOV, lens-to-display spacing, 'total thickness,' and other metrics. For example, total thickness may include a display thickness, a distance between lens array and display, and a lens array thickness. In some examples, the parameters can be selected to minimize thickness and maximize resolution for a given display. In some examples, since retinal blur cues are not needed, larger lenses may be used than typically used to detect retinal blur cues. In some examples, the lens array pitch, focal length, and display-to-lens spacing may be selected based on any of the considerations discussed above.

The diagram of FIG. 5 is not intended to indicate that the example thick lens model 500 is to include all of the components shown in FIG. 5. Rather, the example thick lens model 500 can be implemented using fewer or additional components not illustrated in FIG. 5 (e.g., additional lenses, dimensions, screens, etc.).

Figure 6A:
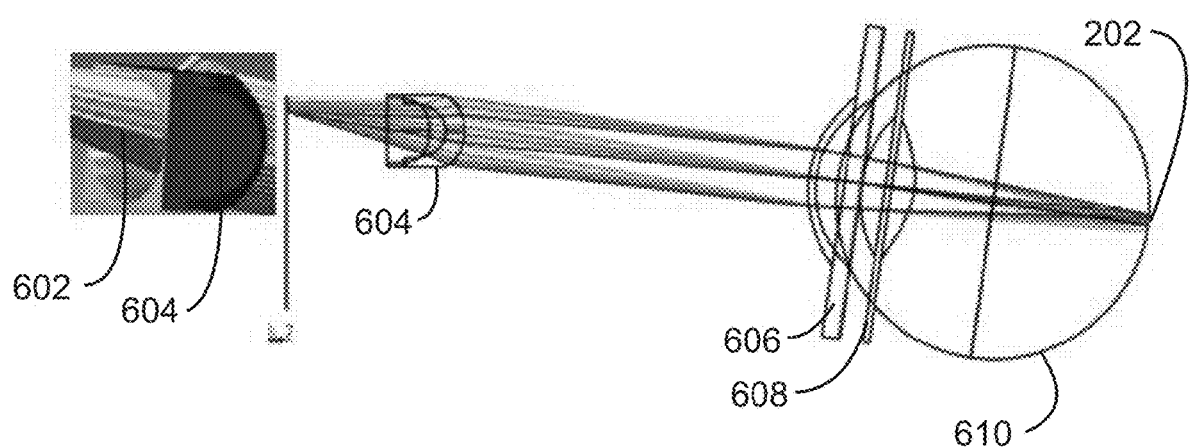
FIG. 6A is a diagram illustrating an example lens design using aspheric surfaces.

FIG. 6A is a diagram illustrating an example lens design using aspheric surfaces. The example lens design is referred to generally by the reference number 600A and can be implemented in the computing device 1600 below in FIG. 16 using the method 1500 of FIG. 15 below.

The example lens design 600A is shown with respect to one lens 302 of a lens array. The lens design 600A is shown receiving a directed form of light 602. The lens design 600A includes an aspheric lens 604. FIG. 6A also shows an iris plane 606 and lens plane 608 of a model eye 610. The model eye 610 also includes an eye center 202.

As described in greater detail above, the basic physical design parameters such as lenslet pitch, virtual object distance, screen-lenslet spacing, and eye relief may be first determined to satisfy the desired eye-box, magnification, elemental image size, spatial resolution, and field of view (FOV). Afterwards, the individual lens parameters can be set to be variables while an optimizer can iterate to find the best combination of parameters that minimizes a preset objective function. For example, the individual lens parameters may include radii of curvatures, position, thickness, conic, high-order surface terms, etc.

As shown in FIG. 6A, in some examples, the lens design 600A may use aspheric lenses 604 to eliminate spherical aberrations. For example, the spherical aberrations may be caused by the curvature of the screen. In some examples, the individual lens parameters of each of the aspheric lenses 604 can be adjusted to remove spherical aberrations.

In some examples, to improve the accuracy of the optical design, a realistic eye model that reflects the human eye's sensitivity in the visible spectrum can be used. For example, higher weight may be given to green wavelengths. For example, wavelengths of approximate 0.555 micrometers may be given a weight of 1.0, while wavelengths of approximately 0.47, 0.51, 0.61, and 0.65 may be given weights of 0.091, 0.503, 0.503, and 0.107, respectively. In some examples, the eye model may also include varying visual acuity on the retina. As one example, a visual acuity of 0.3 milliradians or approximately 2.5 micrometers may be given to the fovea. Thus, higher weight may be given to the fovea region of the retina. In some examples, given rotation of the eye, a logarithmic function may be used to provide a weight of 1.0 to a 0 degree vertical angle offset, a 0.2 weight to a 10 degree angle offset, and a 0.02 weight to a 45 degree angle offset. The human eye has four key dynamic parameters that can be considered in the eye model: position, rotation, iris aperture, and lens focus. For example, the eye model may have a focal length of approximately 17 millimeters in air. In some examples, the eye model may have a designed focus at 1000 millimeters with a focus range of 170 millimeters. A horizontal FOV for both eyes may be 200 degrees, including 100 degrees outward and 60 degrees inwards. A vertical FOV for the eyes may be 135 degrees, with 60 degrees upward FOV and 75 degrees downward FOV. In addition, the eye model may include a design aperture of 3.6 millimeters with a range of approximately 2 to 8 millimeters in diameter.

The diagram of FIG. 6A is not intended to indicate that the example lens design 600A is to include all of the components shown in FIG. 6A. Rather, the example lens design 600A can be implemented using fewer or additional components not illustrated in FIG. 6A (e.g., additional dimensions, lenses, eye models, etc.).

Figure 6B:
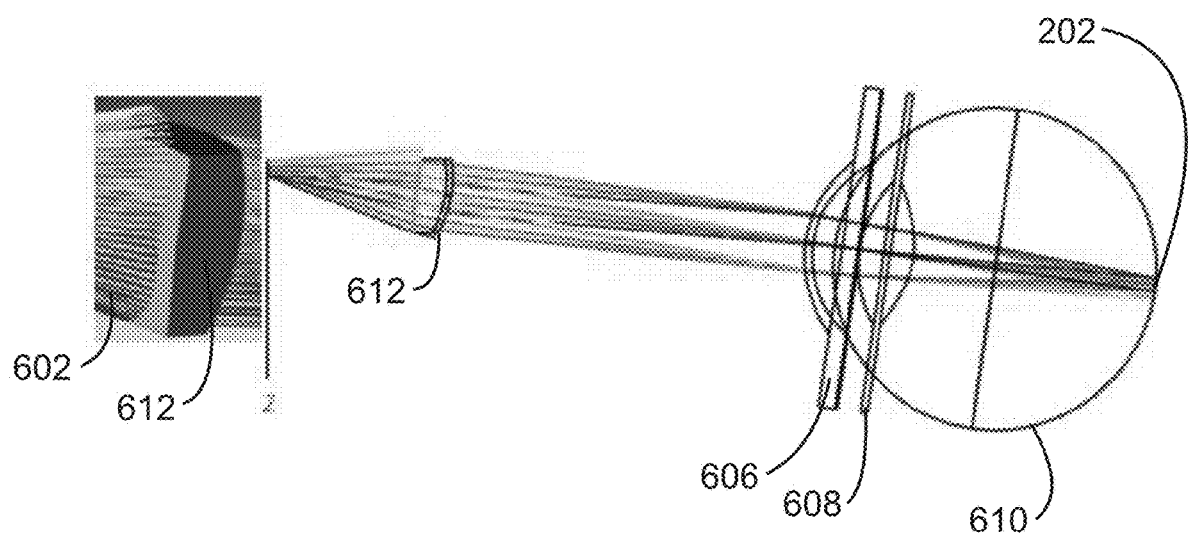
FIG. 6B is a diagram illustrating an example lens design using free-form surfaces.

FIG. 6B is a diagram illustrating an example lens design using free-form surfaces. The example lens design is referred to generally by the reference number 600B and can be implemented in the computing device 1600 below in FIG. 16 using the method 1500 of FIG. 15 below.

The example lens design 600B includes similarly numbered elements from FIG. 6A. The lens design 600B includes light rays 602 from the same point source as FIG. 6A, but shown being focused using a free form lens 612 instead.

As described in FIG. 6A above, aspheric lens surfaces can be used to eliminate spherical aberrations. However, the aspheric lens surfaces may be rotationally symmetric. Thus, the aspheric lens surfaces may not be able to be optimized or curved for a given eye position. This may be especially true for off-axis lenslets. In some examples, free-form optics may be better suited for any given eye position as they are non-symmetric and the optimizer can fully control the shape and curve of their surfaces by optimizing the coefficients of high-order polynomials in both X and Y directions or as radial coefficients. Each lens in the lenslet array can thus be optimized separately so the elemental images are formed sharply on the retina.

In some examples, a multi-state focus tunable heterogeneous lens optimization may include dynamic or switchable lens arrays to vary the virtual image distance. A focus-tunable design may enable larger rendered depth of field and eliminate the vergence-accommodation conflict problem resulting in more natural scenery. In particular, the vergence-accommodation conflict forces a viewer's brain to unnaturally adapt to conflicting cues and increases fusion time of binocular imagery, while decreasing fusion accuracy. More specifically, retinal blur is the actual visual cue driving the oculomotor response of accommodation, or adjustment of the eye's lens to focus on the desired depth to minimize the blur. Retinal disparity is the visual cue that drives vergence. In addition, there is a dual and parallel feedback loop between vergence and accommodation in which one becomes a secondary cue influencing the other. In typical HMD designs, the virtual image may be focused at a fixed depth away from the eyes, while the depth of virtual objects and thus binocular disparity may vary with the content, which may result in conflicting information within vergence-accommodation feedback loops. The vergence-accommodation conflict can cause visual fatigue in users, particularly after prolonged use. A focus-tunable design allows for presenting multiple image planes at different virtual distances creating an appearance of the volumetric image rather than just a single image surface. In some examples, a programmable lens array can also be reconfigured to compensate for user's own optical aberrations eliminating the need for visual-aid glasses when using thin VR HMD. For example, the curving and shape of individual lenses may be adjusted based on the user's known optical aberrations.

The diagram of FIG. 6B is not intended to indicate that the example lens design 600B is to include all of the components shown in FIG. 6B. Rather, the example lens design 600B can be implemented using fewer or additional components not illustrated in FIG. 6B (e.g., additional dimensions, lenses, eye models, etc.).

Figure 7A:
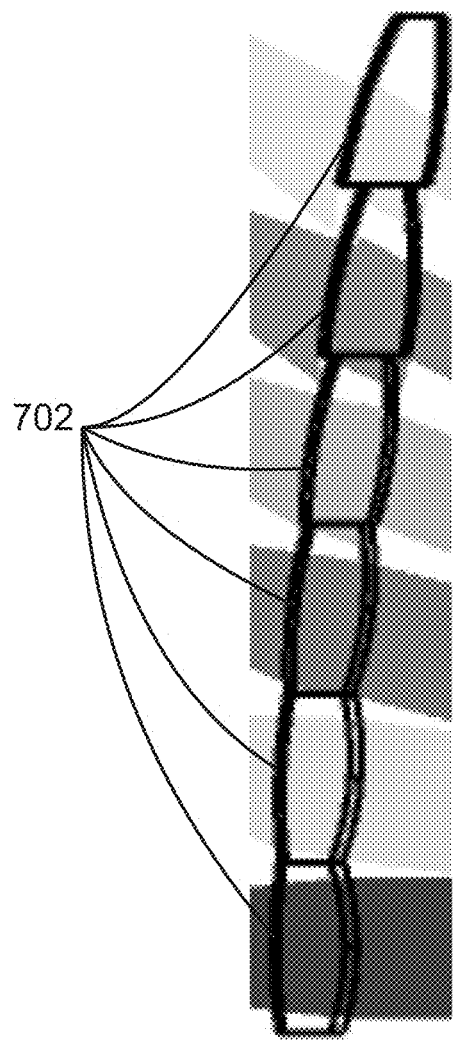
FIG. 7A is a diagram illustrating an example heterogeneous free-form lenslet array.

FIG. 7A is a diagram illustrating an example heterogeneous free-form lenslet array. The example heterogeneous free-form lenslet array is referred to generally by the reference number 700A and can be implemented in the computing device 1600 below in FIG. 16 using the method 1500 of FIG. 15 below.

The example heterogeneous free-form lenslet array 700A is shown with six lenslets 702. The heterogeneous free-form lenslet array 700A is shown magnifying individual rays of light.

As shown in FIG. 7A, the heterogeneous free-form lenslet array 700A may include differently shaped heterogeneous lenslets to reduce aberrations. In some examples, lenslet arrays may include periodic patterns where the lenslets are identical across the array regardless of how the eye is positioned or oriented. For example, the principal planes of lenslets of the patterned design can be replicated along an arc of a curvature radius based on an eyeball radius, an eye relief, and a lens thickness. The curvature radius R may be calculated using the equation:

$$R = \text{Eyeball Radius} + \text{Eye Relief} + \text{HalfLensThickness} \qquad \text{Eq. 1}$$

However, in some examples, using identical lenslets may result in significant aberrations due to the optical path differences in the off-axial lenslets as opposed to the on-axis one aligned with the eye's axis. Therefore, a heterogeneous design in which each lenslet is optimized separately can be used to reduce or balance all aberrations and deliver sharper and higher-resolution scenery to users, as described in FIG. 7B below.

The diagram of FIG. 7A is not intended to indicate that the example heterogeneous free-form lenslet array 700A is to include all of the components shown in FIG. 7A. Rather, the example heterogeneous free-form lenslet array 700A can be implemented using fewer or additional components not illustrated in FIG. 7A (e.g., additional lenses, dimensions, light rays, eyes, etc.).

Figure 7B:
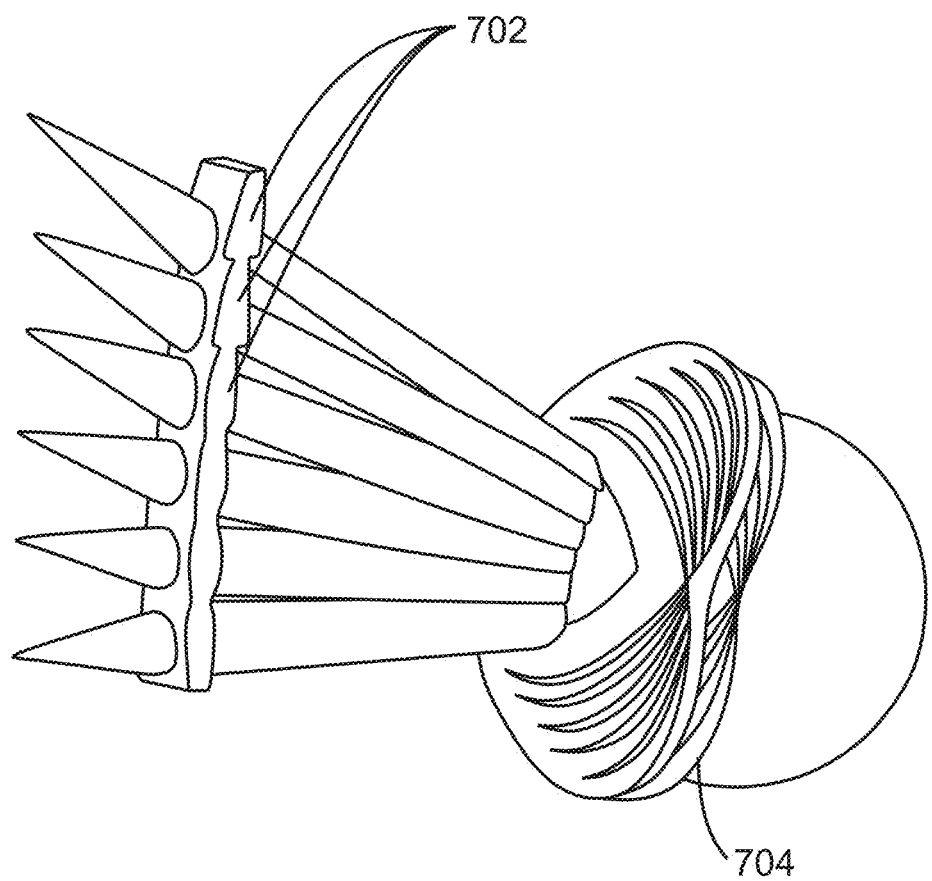
FIG. 7B is a diagram illustrating an example 6 lens heterogeneous free-form lenslet array adapted for eye rotation.

FIG. 7B is a diagram illustrating an example heterogeneous free-form lenslet array adapted for eye rotation. The example heterogeneous free-form lenslet array is referred to generally by the reference number 700B and can be implemented in the computing device 1600 below in FIG. 16 using the method 1500 of FIG. 15 below.

The example heterogeneous free-form lenslet array 700B includes a six lenses 702. The heterogeneous free-form lenslet array 700B may have been optimized for eye rotation.

As shown in FIG. 7B, the heterogeneous free-form lenslet array 700B is shown magnifying light rays towards a rotating eye 704. Since the human eye is realistically continuously scanning scenery, the optical design can be either optimized for a fixed eye rotation or optimized such that the best rendered resolution is always aligned with the fovea region. For example, in a fixed eye rotation, the heterogeneous free-form lenslet array 700B may be optimized such that the rendered object is optimal for the whole screen. In some examples, the best rendered resolution may be always aligned with the fovea region or eye center since the peripheral regions may be of low resolution. For example, the lenslets may be adapted in either fixed adaptation at the designing stage or in a real-time adaptation using dynamic optics to account for various eye rotations. In some examples, the optimizer may elect to bend the off-axial lenses as shown in FIG. 7B to improve performance.

The diagram of FIG. 7B is not intended to indicate that the example heterogeneous free-form lenslet array 700B is to include all of the components shown in FIG. 7B. Rather, the example heterogeneous free-form lenslet array 700B can be implemented using fewer or additional components not illustrated in FIG. 7B (e.g., additional lenses, dimensions, light rays, eyes, etc.).

Figure 8:
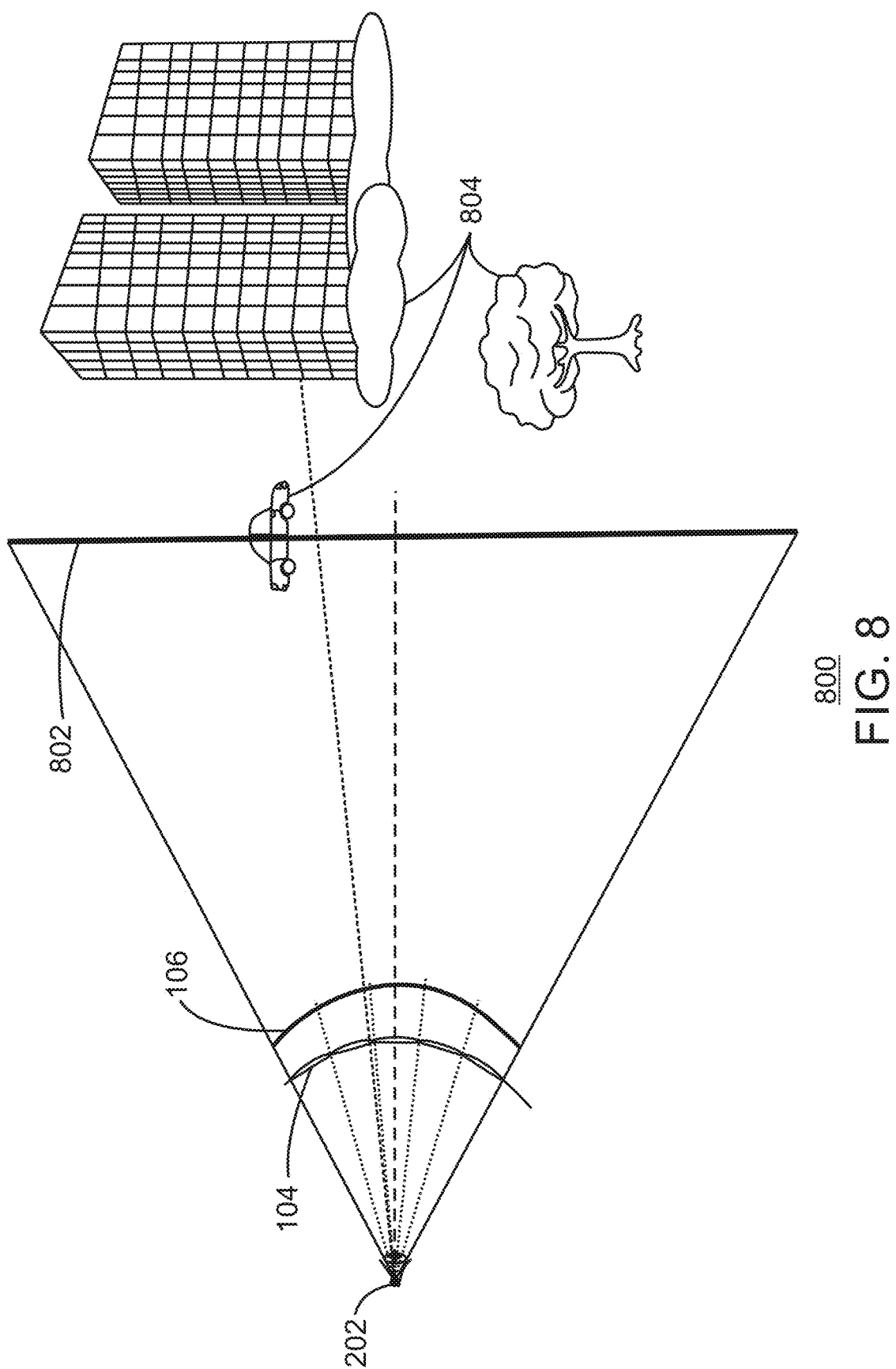
FIG. 8 is a diagram illustrating an example system for rendering 3D content to a virtual plane.

FIG. 8 is a diagram illustrating an example system for rendering 3D content to a virtual plane. The example system is referred to generally by the reference number 800 and can be implemented in the computing device 1600 below in FIG. 16 using the method 1500 of FIG. 15 below.

The example system 800 is shown with respect to one eye center 202. The system 900 includes a curved lens array 104 magnifying a set of elemental images from a curved screen 106. The system 800 further includes a virtual plane 802 and three dimensional content 804.

In the example of FIG. 8, the elemental images corresponding to three dimensional content 804 presented by the curved screen 106 may have been rendered to a single virtual plane 802. For example, the virtual plane 802 may be emulating a virtual plane in a stereo head mounted display.

The diagram of FIG. 8 is not intended to indicate that the example system 800 is to include all of the components shown in FIG. 8. Rather, the example system 800 can be implemented using fewer or additional components not illustrated in FIG. 8 (e.g., additional eyes, curved lens arrays, curved screens, virtual surfaces, content, etc.).

Figure 9:
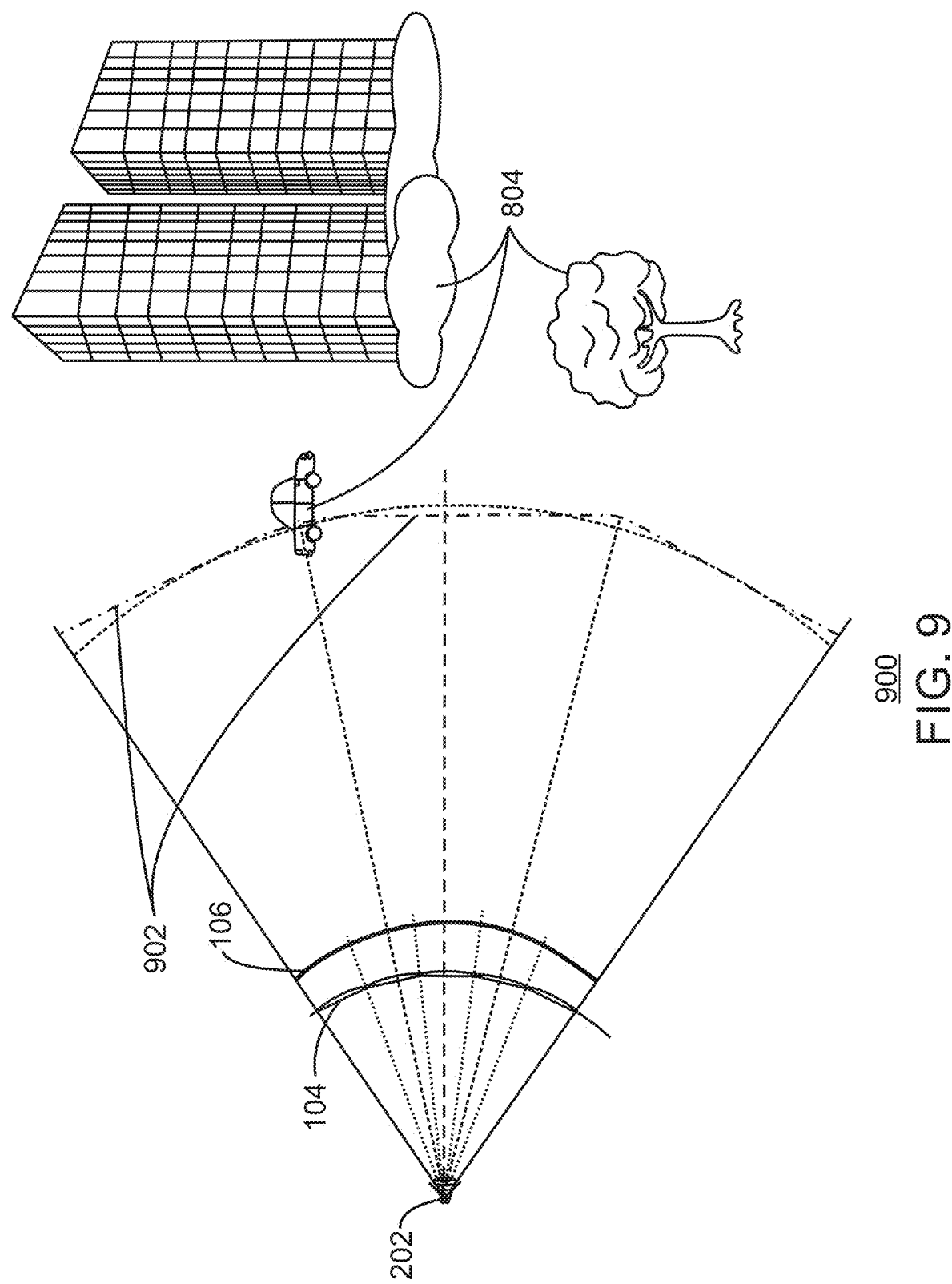
FIG. 9 is a diagram illustrating an example system for rendering 3D content to a cylindrical rendering surface.

FIG. 9 is a diagram illustrating an example system for rendering 3D content to a cylindrical rendering surface. The example system is referred to generally by the reference number 900 and can be implemented in the computing device 1600 below in FIG. 16 using the method 1500 of FIG. 15 below.

The example system 900 is shown with respect to one eye center 202. The system 900 includes a curved lens array 104 magnifying a set of elemental images from a curved screen 106. The system 900 includes a cylindrical virtual surface 902 and three dimensional content 804.

As shown in FIG. 9, since the FOV of the HMD containing the curved screen 106 and curved lens array 104 may be large, a better approximation of the pixel colors can be achieved by selecting a more complex but still simple set of virtual surfaces instead of a single plane 802 as used in FIG. 8 above. For example, the cylindrical virtual surface 902 may be a set of flat planes angled to form an approximately cylindrical surface. The virtual cylindrical surface 902 may be used to render three dimensional content 804 onto the curved screen 106 to thus provide a more accurate presentation.

The diagram of FIG. 9 is not intended to indicate that the example system 900 is to include all of the components shown in FIG. 9. Rather, the example system 900 can be implemented using fewer or additional components not illustrated in FIG. 9 (e.g., additional eyes, curved lens arrays, curved screens, virtual surfaces, content, etc.).

Figure 10:
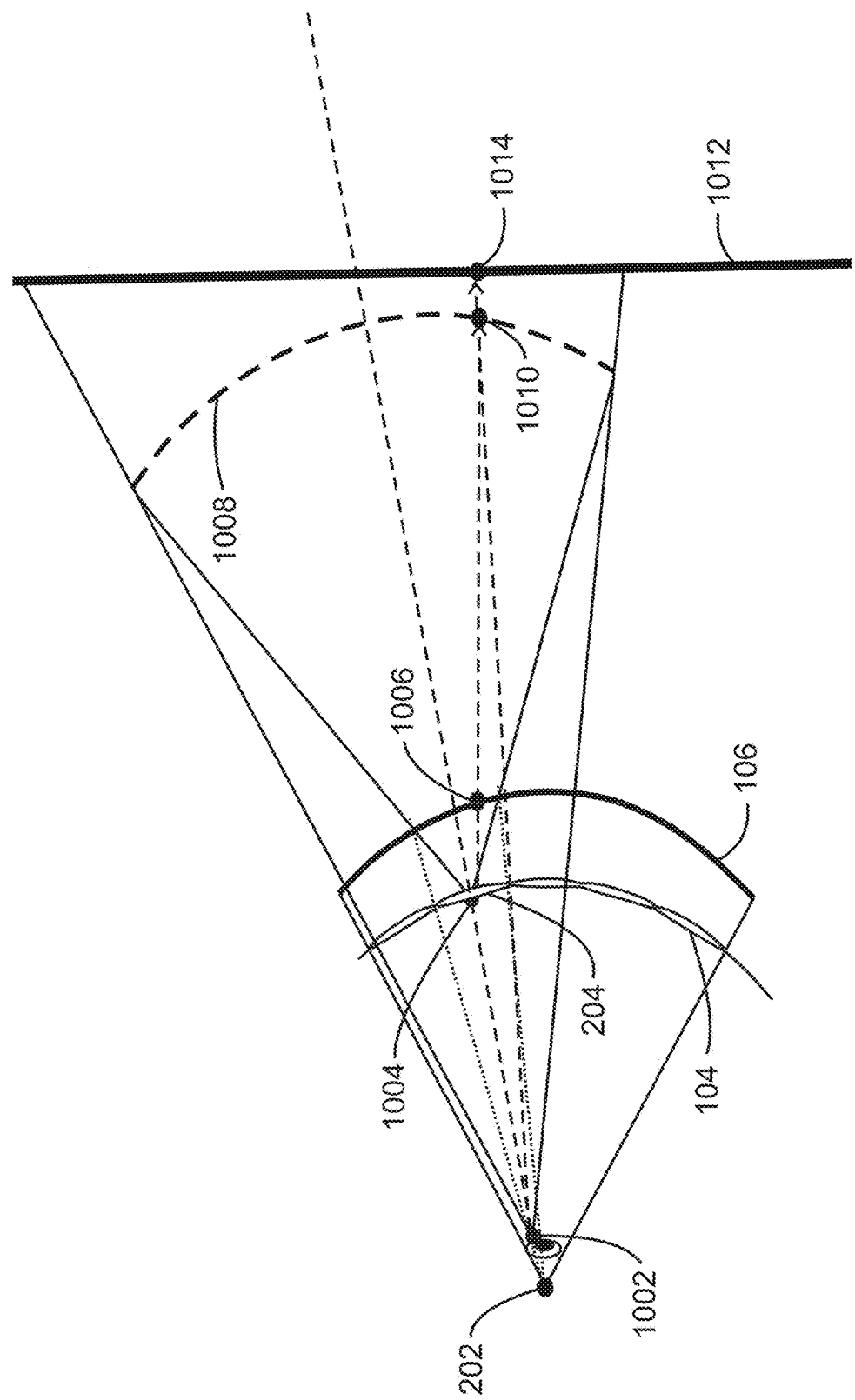
FIG. 10 is a diagram illustrating an example mapping of an image plane onto an elemental image.

FIG. 10 is a diagram illustrating an example mapping of an image plane onto an elemental image. The example mapping is referred to generally by the reference number 1000 and can be implemented in the computing device 1600 below in FIG. 16 using the method 1500 of FIG. 15 below.

The example mapping 1000 is shown with respect to one eye center 202 of an eye. The mapping 1000 includes a center of projection 1002. The mapping 1000 also includes a center of lens 1004 shown with respect to a lens 204 in a curved lens array 104. The mapping 1000 also includes an elemental image pixel 1006 presented on a curved screen 1006. The mapping 1000 further includes a virtual image 1008 including a virtual image of the pixel 1010. The mapping 1000 further includes a virtual plane 1012 and a pixel 1014 on the virtual plane 1012 corresponding to elemental image pixel 1006 and virtual image pixel 1010.

As shown in FIG. 10, the mapping 1000 may be used to map a virtual plane 1012 to an elemental image presented on the curved screen 106. In some examples, the mapping 1000 may be used for a two ray casting operation where rays intersect with simple surfaces. For example, for each elemental image, a processor can select a center of projection 1002. The center of projection 1002 may be determined from a range of possible locations as described with respect to FIG. 11 below. For each pixel 1006 of elemental image, the processor can find the projection of pixel 1006 through the lens center 1004 onto virtual image 1008. The result may be virtual image pixel 1010, or the intersection of ray of light passing through lens center 1004 with virtual image 1008. The processor can then find the projection of virtual image pixel 1010 through the projection center 1002 onto the virtual image plane 1012. The result may be point 1014. The processor may then fetch the color from point 1014 and set it to elemental image pixel 1006. Each virtual image 1008 of elemental image 1006 creates a perspective projection view centered at center of projection 1002. Views from multiple elemental images can be used to create multiple views of a virtual plane 1014 in the vicinity of a viewer's eye. In some examples, the positions of the center of projection 1002 may be pre-selected and fixed when eye tracking is not available.

The diagram of FIG. 10 is not intended to indicate that the example mapping 1000 is to include all of the components shown in FIG. 10. Rather, the example mapping 1000 can be implemented using fewer or additional components not illustrated in FIG. 10 (e.g., additional dimensions, pixels, virtual surfaces, etc.).

Figure 11:
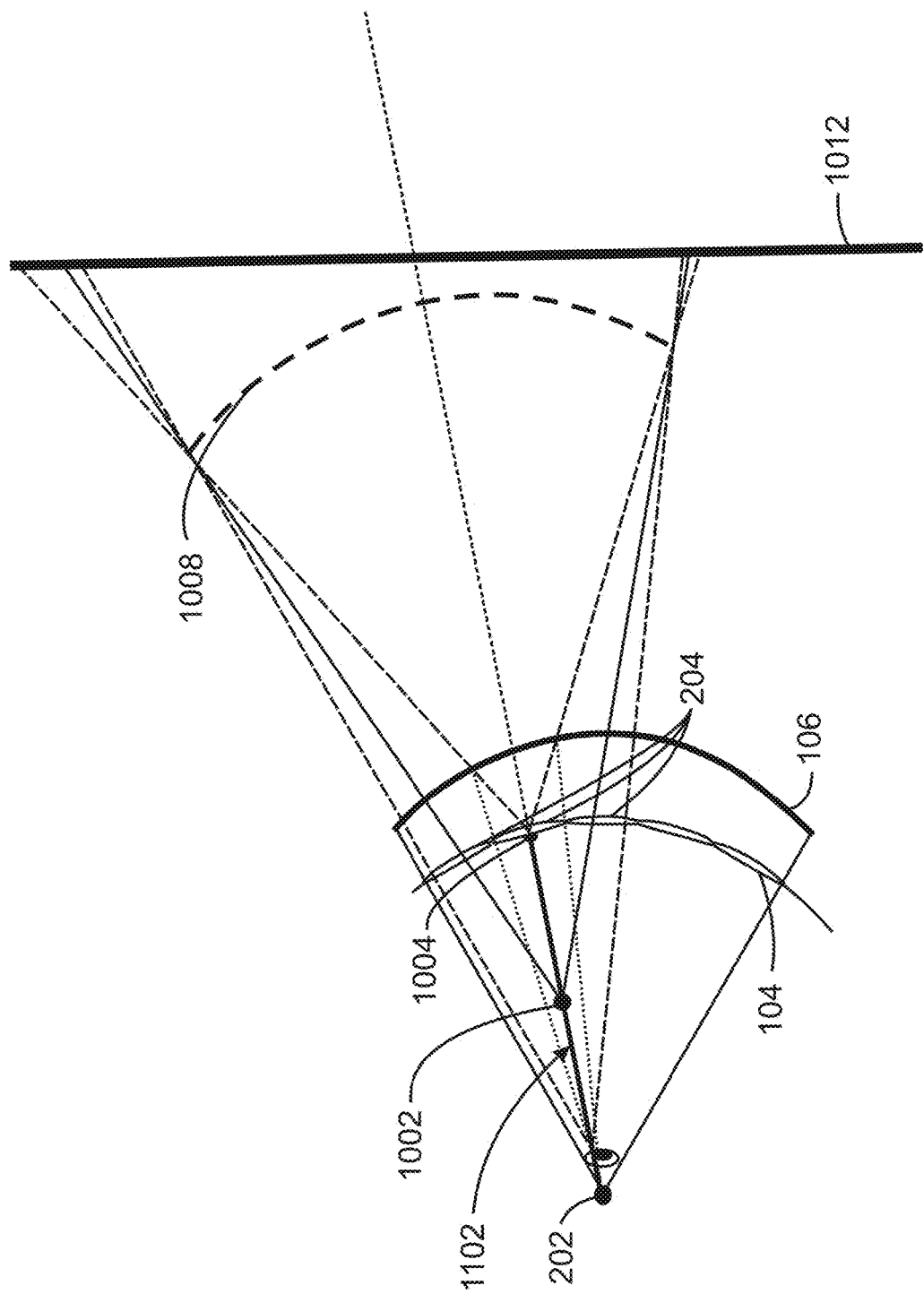
FIG. 11 is a diagram illustrating an example range of locations for a center of projection when rendering elemental images.

FIG. 11 is a diagram illustrating an example range of locations for a center of projection when rendering elemental images. The example range of locations is referred to generally by the reference number 1100 and can be implemented in the computing device 1600 below in FIG. 16 using the method 1500 of FIG. 15 below.

The example range of locations 1100 is shown with respect to one eye center 202 of an eye. The range of locations 1100 includes a center of projection 1002 located along a range 1102 of locations of the center of projection 1002. The range 1102 extends from the eye center 202 to the lens center 1004 of one of the lenses 204 of a curved lens array 104. FIG. 11 also includes a curved screen 106 and virtual image 1008 associated with virtual plane 1012.

As shown in FIG. 11, the range of locations 1102 for the center of projection 1002 extends from the eye center 202 to the center 1004 of one of a lens 204. In some examples, as discussed above, when eye tracking is not available, the center of projection 1002 can pre-selected and fixed. Thus, where exact viewer eye position is assumed, the center of projection 1002 can be located on the line 1102 connecting the center of the lens 1004 and elemental image at a fixed distance from the lens, or more specifically, the lens principal plane. In some examples, the fixed distance can be equal or close to the ideal eye relief. For example, the ideal eye relief may defined by the intended eye location for which perspective projections of virtual images will give absolutely correct fused image. The actual value of the fixed distance may be an adjustment parameter or calibration parameter of the system allowing to compensate for deviations in spacing and lens focal length. Thus, the center of the lens 1004 can be selected from a range 1102 of locations allowing tradeoff between amount of parallax and projection distortions or plane swim. For example, if an image is rendered for a specific eye position, then the image plane may appear distorted when your eye moves form that position, which is referred to as plane swim. In some examples, multiple image planes may all shift or distort when and eye of a user moves from the intended eye position. Therefore, either the pixels for the eye position may be updated or the projection center may be moved towards the optical center of the lens accordingly.

In some examples, when eye tracking is available, the center of projection 1002 can be selected in the vicinity of the center of the eye aperture. Furthermore, in some examples, it may be possible to identify lenses and regions of virtual surfaces that deliver image to the fovea of the eye and use multi-resolution shading or foveated rendering techniques. For example, less resolution may be provided to areas of an image that are less visible due to less light or areas that are in the periphery of human vision, respectively.

The diagram of FIG. 11 is not intended to indicate that the example range of locations 1100 is to include all of the components shown in FIG. 11. Rather, the example range of locations 1100 can be implemented using fewer or additional components not illustrated in FIG. 11 (e.g., additional centers of projection, dimensions, pixels, virtual surfaces, etc.).

Figure 12:
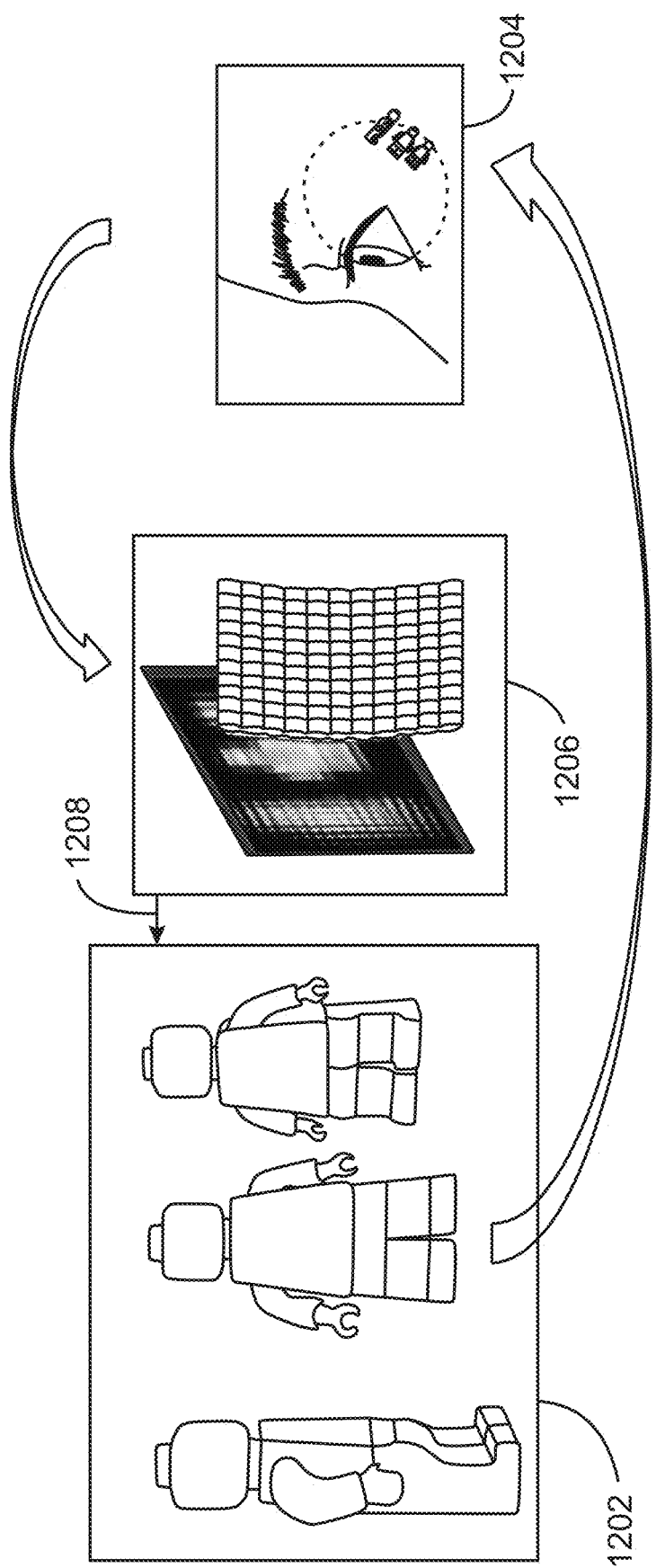
FIG. 12 is a block diagram illustrating an example method of rendering elemental images using ray tracing.

FIG. 12 is a block diagram illustrating an example method of rendering elemental images using ray tracing. The example method is generally referred to by the reference number 1200 and can be implemented in the computing device 1500 below in FIG. 15. For example, the ray tracing method 1200 can be used in the method 1400 and the elemental image generator of the computing device 1500 of FIG. 15 below.

In some examples, the location of elemental images projected onto a retina may vary with a rotated eye. Therefore, an accurate ray tracing method 1200 can be used to deliver sharp VR rendering for heterogeneous lens array.

At block, 1202, a processor can receive a virtual image to be used to render the elemental images. The virtual image may include three dimensional content to be displayed to a user in a head mounted display. For example, the virtual image may be a single plane of a stereo pair created by rendering 3D models.

At block 1204, the processor can establish a correspondence between the virtual image and the retina. For example, the processor can determine a correspondence between the virtual image and the retina for a set of given eye parameters without including any optics. In some examples, the correspondence may be a mapping between the virtual image and retina. The mapping may be used to determine content on the retina for a given set of eye parameters. In some examples, the mapping may be stored in a look-up table containing mappings for a variety of eye parameter combinations. Thus, given an optical design and an eye model, the processor can accurately trace rays for various eye parameters and generate in advance look-up tables storing the correspondence mapping information between the screen and the retina.

At block 1206, the processor back-projects the retinal pixels through a heterogeneous free-form lens array to the screen using the precomputed look-up table so that the elemental images content on the screen is computed. In some examples, for each traced ray, the look-up table can provide the launching screen pixel $(x_o, y_o)$, the direction of the ray $(P_x, P_y)$, the landing location on retina $(x_i, y_i, z_i)$, the ray's wavelength ($\lambda$), the ray's intensity (I) in case of absorbing/attenuating martials, and whether or not that traced ray is vignetted.

As shown by arrow 1208, the method 1200 can be repeated in real-time to accurately reflect any change of eye parameters or the scenery on the rendered VR content. In some examples, a change of eye parameters can be estimated using an eye pupil tracker. For example, the eye parameters can be accurately estimated in real-time using eye pupil tracker and utilized to determine which look-up table to consider for synthesizing the elemental images that best render the fused sharp VR image.

This process flow diagram is not intended to indicate that the blocks of the example method 1200 are to be executed in any particular order, or that all of the blocks are to be included in every case. Further, any number of additional blocks not shown may be included within the example method 1200, depending on the details of the specific implementation.

FIG. 13 is a table comparing example spot diagrams of field points aligned with a fovea of a rotated eye for identical and heterogeneous lens designs. The table is generally referred to by the reference number 1300. For example, the spot diagrams 1300 may indicate resolution performance using the head mounted display 100 of FIG. 1, the method 1400 of FIG. 14, the head mounted display 1526 of FIG. 15 below, with an identical array of aspheric lenses 604 of FIG. 6A versus an array of free form lenses 612 of FIG. 6B.

FIG. 13 includes a row of various eye rotation values 1302, and a corresponding sets of identical lens spot diagrams 1304 and heterogeneous lens spot diagrams 1306, referenced using the reference numbers 1308-1318 and 1320-1330, respectively. FIG. 13 illustrates an example of the resolution improvement made by using a heterogeneous lens array design as opposed to the resolution delivered by identical lens array design. The spot diagrams 1308-1330 represent the point spread function (PSF) for field points aligned with the fovea of an eye for various eye rotations 1302. The RMS radius values measured in micrometers (μm) quantify the delivered resolution.

As shown in FIG. 13, the RMS radius values for identical lenses at various eye rotations 1308-1318 range from 12.510 at zero degrees rotation to 1006.74 at 32.45 degrees rotation. By contrast, the RMS radius values for heterogeneous lenses at various eye rotations 1320-1330 range from 12.445 at zero degrees to a much smaller 23.260 at 32.45 degrees. Thus, although identical 1304 and heterogeneous 1306 lens arrays may perform similarly at zero degrees of rotation, the heterogeneous 1306 lens array outperforms the identical 1304 lens array at every angle of rotation, with increasingly improved performance as the rotation angle increases.

Figure 14:
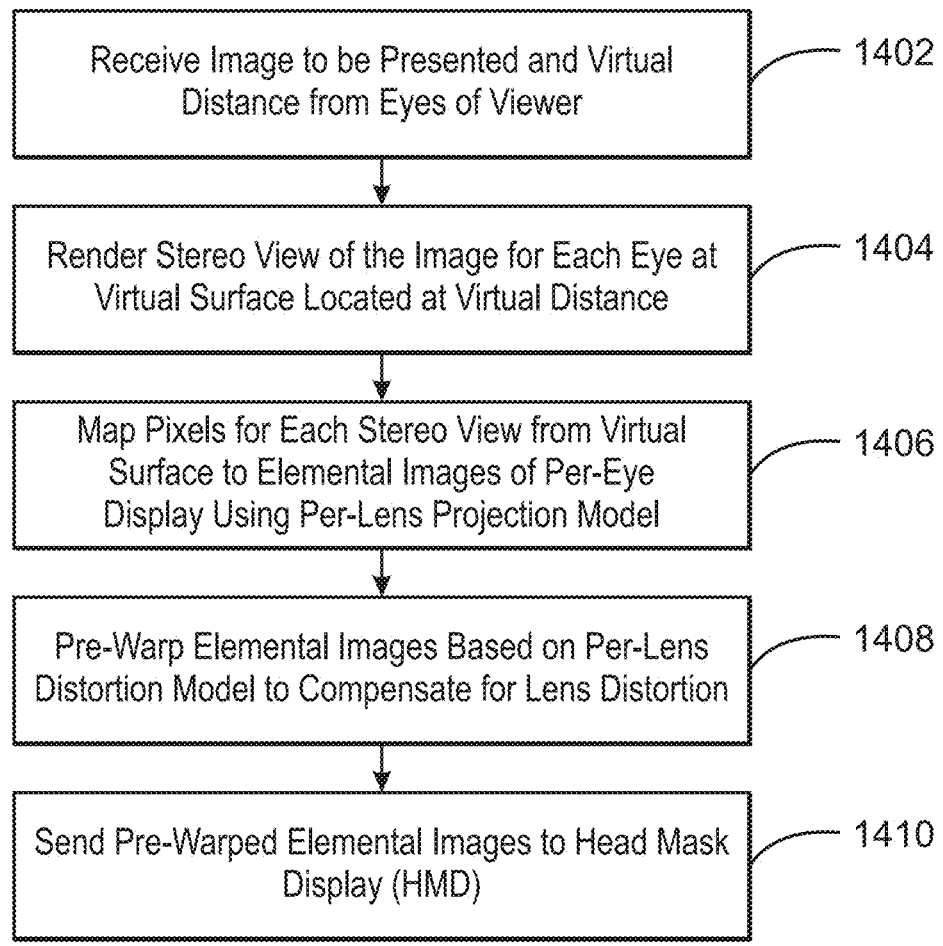
FIG. 14 is a flow chart illustrating a method for generating elemental images to be presented via a head mounted display.

FIG. 14 is a flow chart illustrating a method for generating elemental images to be presented via a head mounted display. The example method is generally referred to by the reference number 1400 and can be implemented in the processor 1502 of the computing device 1500 of FIG. 15 below, or the computer readable media 1600 of FIG. 16 below. In some examples, the method 1400 may be used to generate elemental images to be displayed via the head mounted display 100 of FIG. 1 above or the head mounted display 1526 of FIG. 15 below.

At block 1402, a processor receives an image to be presented and a virtual distance from eyes of a viewer. For example, the image may be a three dimensional scene to be displayed. In some examples, the image may be a three dimensional model. The virtual distance may be a distance between a virtual surface and an eye center. For example, the virtual distance may be the screen surface radius 512 described with respect to FIG. 5 above.

At block 1404, the processor renders a stereo view of the image for each of the eyes at a virtual surface located at the virtual distance. In some examples, the virtual surface may be a plane. For example, the virtual surface may be similar to the plane 802 describe in FIG. 8 above. The virtual surface may be a plane of an emulation of a traditional stereo HMD with two flat screen planes located at a given virtual distance from the viewer's eyes. In some examples, the virtual surface may be a cylindrical surface or a piecewise linear approximation of a cylindrical surface. For example, the virtual surface may be the cylindrical surface described with respect to FIG. 9 above.

At block 1406, the processor maps pixels for each of the stereo views from the virtual surface to elemental images of a per-eye display using a per-lens projection model. In some examples, the per-lens projection model may include a perspective projection of virtual image with a center of projection assigned to a particular individual lens. For example, the per-lens projection model may include pixel 1014 on the virtual plane 1012 being projected to a pixel 1006 on the screen 106 using optical center 1004 of the lens 204 as the center of aforementioned projection, as shown in FIG. 10 above. In some examples, the pixels may be mapped using a pixel shader.

At block 1408, the processor pre-warps the elemental images based on a per-lens distortion model to compensate for a lens distortion. Distortion as used herein refers to a deviation from rectilinear projection, which is a projection in which straight lines in a scene remain straight in an image. For example, the per-lens distortion model may include a polynomial approximation of deviation of pixel coordinates from a rectilinear projection.

At block 1410, the processor sends the pre-warped elemental images to a head mounted display to be displayed. For example, the head mounted display may be the head mounted display of FIG. 1 above or FIG. 16 below.

This process flow diagram is not intended to indicate that the blocks of the example process 1400 are to be executed in any particular order, or that all of the blocks are to be included in every case. For example, blocks 1404-1408 can be implemented in any order or granularity that is not breaking data dependency. In some examples, blocks 1406 and 1408 can be combined by using a warping function to re-map the rays and use the derivatives of the warping function for better sampling of a texture of the virtual surface. Further, any number of additional blocks not shown may be included within the example process 1400, depending on the details of the specific implementation. For example, the method 1400 may also include receiving eye tracking data. For example, the processor may receive the eye tracking data from a pupil tracker. In some examples, the processor can render the stereo views and map the pixels using multi-resolution shading. For example, multi-resolution shading may be used to save processing resources by rendering areas that are mapped away from the fovea in a lower resolution. In some examples, the processor can render the stereo views using foveated rendering. For example, the pixels may be rendered with higher resolution towards and inside the fovea.

In some examples, the processor can estimate an eye parameter in real-time using an eye pupil tracker and retrieving a mapping from a look-up table based on the estimated eye parameter. For example, the pixels can be mapped using the ray tracing method 1200 described with respect to FIG. 12 above. In some examples, the processor can use the mapping to generate the elemental images. In addition, in some examples, the pixels may alternatively be mapped using a two ray casting operation. For example, the processor can trace rays for a plurality of eye parameters based on a design of the head mounted display and an eye model to generate a mapping between a screen of the head mounted display and a retina of each of the eyes and storing the mapping in a look-up table. In some examples, the processor can then estimate an eye parameter in real-time using an eye pupil tracker and retrieve the mapping from a look-up table based on the estimated eye parameter to generate the elemental images.

Figure 15:
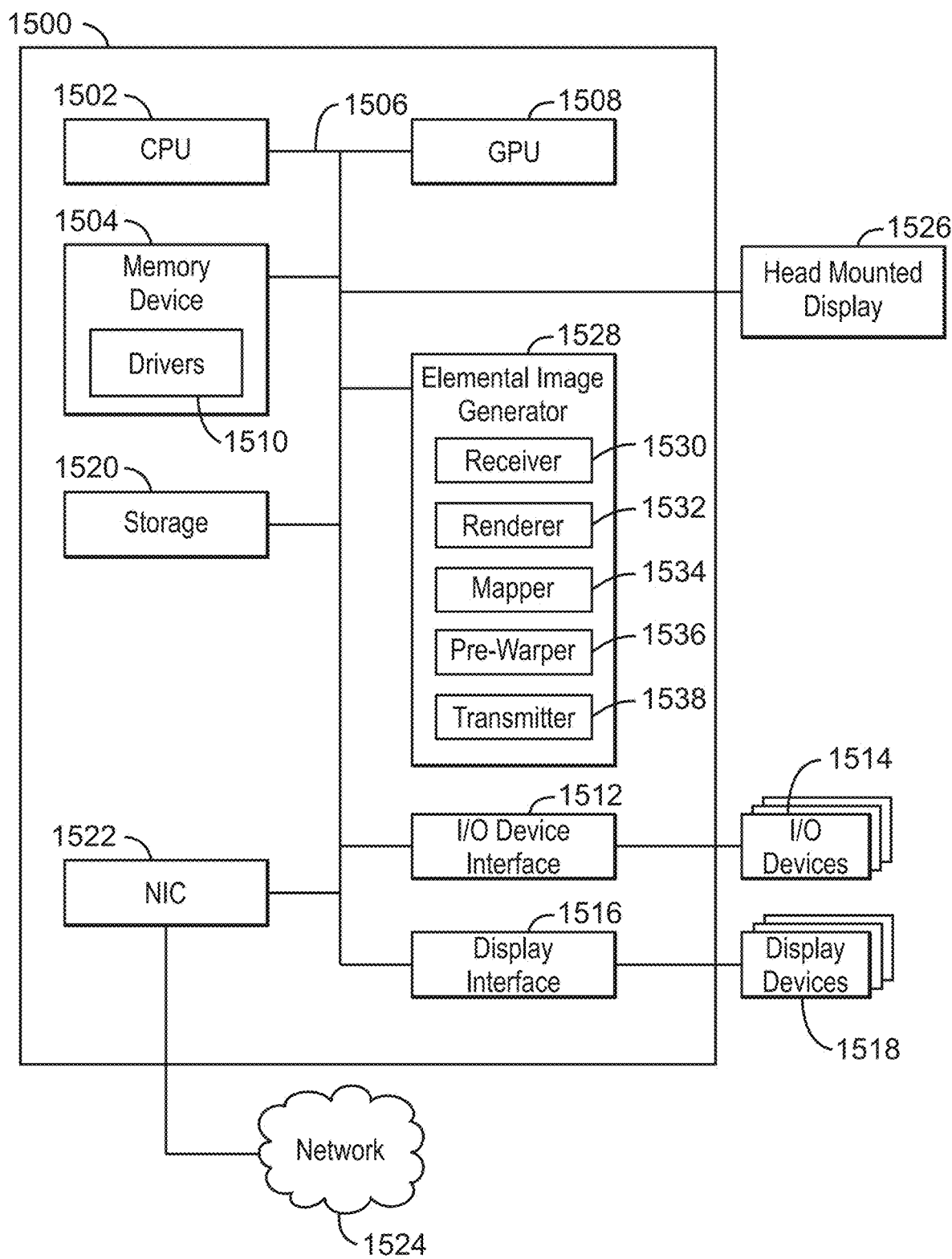
FIG. 15 is block diagram illustrating an example computing device that can render and present elemental images via a head mounted display.

Referring now to FIG. 15, a block diagram is shown illustrating an example computing device that can render and present elemental images via a head mounted display. The computing device 1500 may be, for example, a laptop computer, desktop computer, tablet computer, mobile device, or wearable device, among others. In some examples, the computing device 1500 may be a smart camera or a digital security surveillance camera. The computing device 1500 may include a central processing unit (CPU) 1502 that is configured to execute stored instructions, as well as a memory device 1504 that stores instructions that are executable by the CPU 1502. The CPU 1502 may be coupled to the memory device 1504 by a bus 1506. Additionally, the CPU 1502 can be a single core processor, a multi-core processor, a computing cluster, or any number of other configurations. Furthermore, the computing device 1500 may include more than one CPU 1502. In some examples, the CPU 1502 may be a system-on-chip (SoC) with a multi-core processor architecture. In some examples, the CPU 1502 can be a specialized digital signal processor (DSP) used for image processing. The memory device 1504 can include random access memory (RAM), read only memory (ROM), flash memory, or any other suitable memory systems. For example, the memory device 1504 may include dynamic random access memory (DRAM).

The memory device 1504 can include random access memory (RAM), read only memory (ROM), flash memory, or any other suitable memory systems. For example, the memory device 1504 may include dynamic random access memory (DRAM). The memory device 1504 may include device drivers 1510 that are configured to execute the instructions for device discovery. The device drivers 1510 may be software, an application program, application code, or the like.

The computing device 1500 may also include a graphics processing unit (GPU) 1508. As shown, the CPU 1502 may be coupled through the bus 1506 to the GPU 1508. The GPU 1508 may be configured to perform any number of graphics operations within the computing device 1500. For example, the GPU 1508 may be configured to render or manipulate graphics images, graphics frames, videos, or the like, to be displayed to a user of the computing device 1500.

The memory device 1504 can include random access memory (RAM), read only memory (ROM), flash memory, or any other suitable memory systems. For example, the memory device 1504 may include dynamic random access memory (DRAM). The memory device 1504 may include device drivers 1510 that are configured to execute the instructions for generating elemental images. The device drivers 1510 may be software, an application program, application code, or the like.

The CPU 1502 may also be connected through the bus 1506 to an input/output (I/O) device interface 1512 configured to connect the computing device 1500 to one or more I/O devices 1514. The I/O devices 1514 may include, for example, a keyboard and a pointing device, wherein the pointing device may include a touchpad or a touchscreen, among others. The I/O devices 1514 may be built-in components of the computing device 1500, or may be devices that are externally connected to the computing device 1500. In some examples, the memory 1504 may be communicatively coupled to I/O devices 1514 through direct memory access (DMA).

The CPU 1502 may also be linked through the bus 1506 to a display interface 1516 configured to connect the computing device 1500 to a display device 1518. The display device 1518 may include a display screen that is a built-in component of the computing device 1500. The display device 1518 may also include a computer monitor, television, or projector, among others, that is internal to or externally connected to the computing device 1500.

The computing device 1500 also includes a storage device 1520. The storage device 1520 is a physical memory such as a hard drive, an optical drive, a thumbdrive, an array of drives, a solid-state drive, or any combinations thereof. The storage device 1520 may also include remote storage drives.

The computing device 1500 may also include a network interface controller (NIC) 1522. The NIC 1522 may be configured to connect the computing device 1500 through the bus 1506 to a network 1524. The network 1524 may be a wide area network (WAN), local area network (LAN), or the Internet, among others. In some examples, the device may communicate with other devices through a wireless technology. For example, the device may communicate with other devices via a wireless local area network connection. In some examples, the device may connect and communicate with other devices via Bluetooth® or similar technology.

The computing device 1500 further includes a head mounted display 1526. For example, the head mounted display 1526 may include a curved screen to display a plurality of elemental images. The head mounted display 1526 may also include a curved lens array concentrically displaced in front of the curved screen to magnify the elemental images. For example, each of the plurality of elemental images is magnified by a different lens in the curved lens array. In some examples, the curved lens array may have a lens array pitch and a display spacing based on a target perceived resolution, a target field of view, a target total thickness, and a display pixel pitch. For example, the lens array pitch and a display spacing may be optimized for the target perceived resolution, target field of view, and target total thickness given an existing display pixel pitch. In some examples, the curved lens array may be a heterogeneous array of freeform lenses. In some examples, the curved lens array may include one or more flat sections, one or more cylindrically curved sections, or a combination thereof. In some examples, the head mounted display may include a processor to display the elemental images. For example, the head mounted display 1526 may be a thin HMD with a curve display as described above in FIGS. 1-11 above.

The computing device 1500 further includes an elemental image generator 1528. For example, the elemental image generator 1528 can be used to generate elemental images to be presented on a head mounted display with a curved display. The elemental image generator 1528 can include a receiver 1530, a renderer 1532, a mapper 1534, a pre-warper 1536, and a transmitter 1538. In some examples, each of the components 1530-1538 of the elemental image generator 1528 may be a microcontroller, embedded processor, or software module. The receiver 1530 can receive an image to be presented and a virtual distance from eyes of a viewer. For example, the image may include a three dimensional scene to be displayed in the head mounted display 1526. In some examples, the virtual distance may be a distance between a virtual surface and an eye center of the eyes of a viewer. The renderer 1532 can render a stereo view of the image for each of the eyes at a virtual surface located at the virtual distance. For example, the virtual surface may be a virtual plane. In some examples, the virtual surface may be a cylindrical surface. In some examples, the virtual surface may be a piecewise linear approximation of a cylindrical surface. For example, the piecewise linear approximation of the virtual surface may include a number of flat surfaces arranged in a cylindrical shape. The mapper 1534 can map pixels for each stereo view from the virtual plane to elemental images of a per-eye display using a per-lens projection model. For example, the per-lens projection model may include a perspective projection of a virtual image, as shown in FIG. 10 above. In some examples, the per-lens projection model may include a model of elemental image distortion introduced by the particular lens. For example, the model of elemental image distortion may be a polynomial model. The use of an elemental image distortion model may yield a more accurate and practical calibration. In some examples, each elemental images may be associated with a different lens of a curved lens array. In some examples, the mapper 1534 may be a pixel shader. The pre-warper 1536 can pre-warp the elemental images based on a per-lens distortion model to compensate for a lens distortion. For example, each of the lenses in a curved lens array may be associated with a custom per-lens distortion model to compensate for a lens distortion of each of the lenses of the curved lens array. In some examples, the lenses of the curved lens array may be similar and a similar per-lens distortion model may be used. The transmitter 1538 can send the pre-warped elemental images to a head mounted display to be displayed. For example, the head mounted display may be the head mounted display 1526.

The block diagram of FIG. 15 is not intended to indicate that the computing device 1500 is to include all of the components shown in FIG. 15. Rather, the computing device 1500 can include fewer or additional components not illustrated in FIG. 15, such as additional buffers, additional processors, and the like. The computing device 1500 may include any number of additional components not shown in FIG. 15, depending on the details of the specific implementation. Furthermore, any of the functionalities of the renderer 1532, the mapper 1534, the pre-warper 1536, and the transmitter 1538, may be partially, or entirely, implemented in hardware and/or in the processor 1502. For example, the functionality may be implemented with an application specific integrated circuit, in logic implemented in the processor 1502, or in any other device. Furthermore, any of the functionalities of the CPU 1502 may be partially, or entirely, implemented in hardware and/or in a processor. For example, the functionality of the elemental image generator 1528 may be implemented with an application specific integrated circuit, in logic implemented in a processor, in logic implemented in a specialized graphics processing unit such as the GPU 1508, or in any other device.

Figure 16:
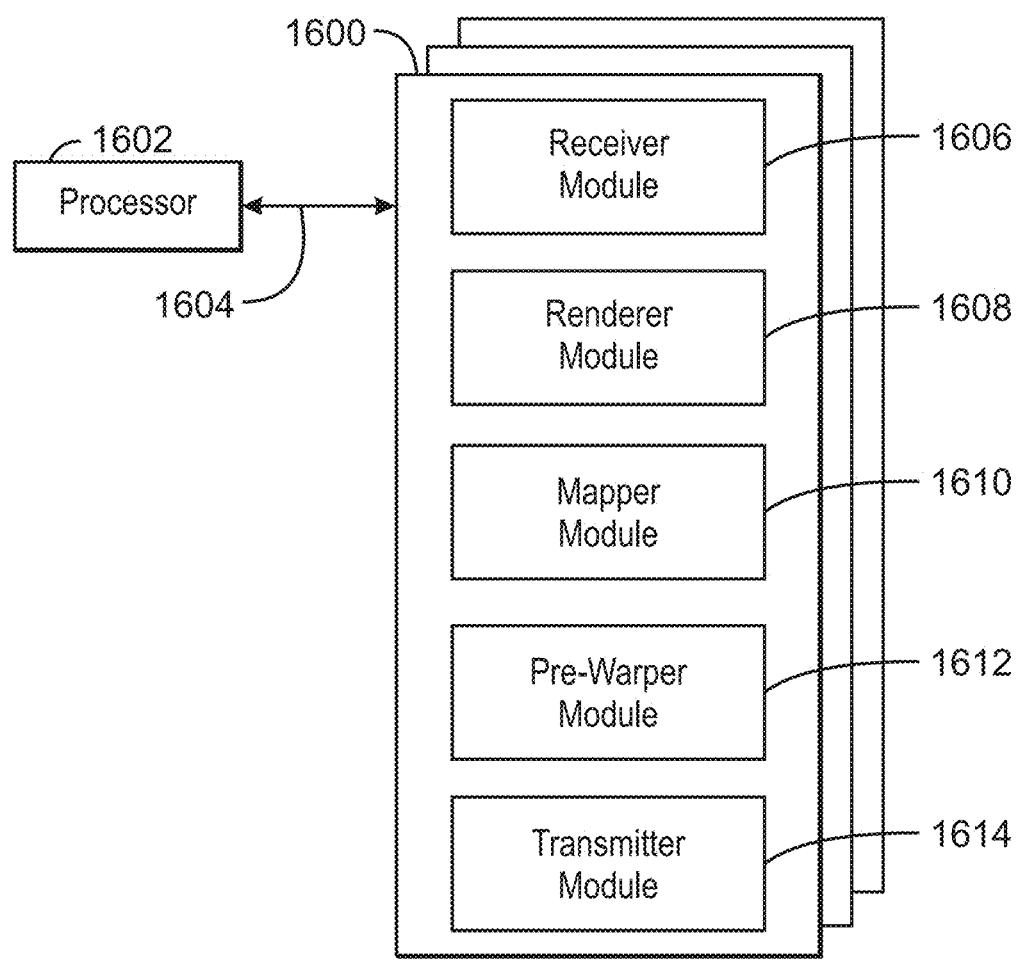
FIG. 16 is a block diagram showing computer readable media that store code for rendering elemental images to be presented via a head mounted display.

FIG. 16 is a block diagram showing computer readable media 1600 that store code for rendering elemental images to be presented via a head mounted display. The computer readable media 1600 may be accessed by a processor 1602 over a computer bus 1604. Furthermore, the computer readable medium 1600 may include code configured to direct the processor 1602 to perform the methods described herein. In some embodiments, the computer readable media 1600 may be non-transitory computer readable media. In some examples, the computer readable media 1600 may be storage media.

The various software components discussed herein may be stored on one or more computer readable media 1600, as indicated in FIG. 16. For example, a receiver module 1606 may be configured to receive an image to be presented and a virtual distance from eyes of a viewer. For example, the virtual image may include three dimensional content to be displayed in a head mounted display. In some examples, the virtual distance may be a distance between a virtual surface and an eye center of the eyes of a viewer. In some examples, the receiver module 1606 may also receive eye tracking data. A renderer module 1608 may be configured to render a stereo view of the image for each of the eyes at a virtual surface located at the virtual distance. For example, the virtual surface may be a virtual plane. In some examples, the virtual surface may be a cylindrical surface. In some examples, the virtual surface may be a piecewise linear approximation of a cylindrical surface. For example, the piecewise linear approximation of the virtual surface may include a number of flat surfaces arranged in a cylindrical shape. In some examples, the renderer module 1608 may configured to render the stereo views using multi-resolution shading based on the eye tracking data. In some examples, the renderer module 1608 may configured to render the stereo views using foveated rendering based on the eye tracking data. A mapper module 1610 may be configured to map pixels for each stereo view from the virtual plane to elemental images of a per-eye display using a per-lens projection model. For example, the per-lens projection model may include a perspective projection of virtual image with a center of projection assigned to a particular individual lens. In some examples, each elemental images may be associated with a different lens of a curved lens array. In some examples, the mapper module 1610 may be a pixel shader. In some examples, the mapper module 1610 may be configured to map the pixels to the elemental images using a two ray casting operation. In some examples, the mapper module 1610 may map the pixels using multi-resolution shading based on the eye tracking data. In some examples, the mapper module 1610 may be configured to trace rays for a plurality of eye parameters based on a design of the head mounted display and an eye model to generate a mapping between a screen of the head mounted display and a retina of each of the eyes and store the mapping in a look-up table. In some examples, the mapper module 1610 may be configured to estimate an eye parameter in real-time using an eye pupil tracker and retrieve a mapping from a look-up table based on the estimated eye parameter. For example, the mapping may be used to generate the elemental images. A pre-warper module 1612 may be configured to pre-warp the elemental images based on a per-lens distortion model to compensate for a lens distortion. For example, each of the lenses in a curved lens array may be associated with a custom per-lens distortion model to compensate for a lens distortion of each of the lenses of the curved lens array. In some examples, the lenses of the curved lens array may be similar and pre-warper module 1612 may be configured to use a similar per-lens distortion model on the lenses. A transmitter module 1614 may be configured to send the pre-warped elemental images to a head mounted display to be displayed.

The block diagram of FIG. 16 is not intended to indicate that the computer readable media 1600 is to include all of the components shown in FIG. 16. Further, the computer readable media 1600 may include any number of additional components not shown in FIG. 16, depending on the details of the specific implementation.

EXAMPLES

Example 1 is an apparatus for displaying stereo elemental images. The apparatus includes two coupled eyepieces. Each of the two eyepieces includes a curved screen to display a plurality of elemental images. Each of the two eyepieces also includes a curved lens array concentrically displaced in front of the curved screen to magnify the elemental images. Each of the plurality of elemental images is magnified by a different lens in the curved lens array.

Example 2 includes the apparatus of example 1, including or excluding optional features. In this example, the curved lens array includes a lens array pitch and a display spacing based on a target perceived resolution, a target field of view, a target total thickness, and a display pixel pitch.

Example 3 includes the apparatus of any one of examples 1 to 2, including or excluding optional features. In this example, the curved lens array includes a heterogeneous array of freeform lenses.

Example 4 includes the apparatus of any one of examples 1 to 3, including or excluding optional features. In this example, the curved lens array includes a flat section, a cylindrically curved section, or any combination thereof.

Example 5 includes the apparatus of any one of examples 1 to 4, including or excluding optional features. In this example, the curved lens array includes a patterned design, wherein principal planes of lenses of the patterned design are replicated along an arc of a curvature radius based on an eyeball radius, an eye relief, and a lens thickness.

Example 6 includes the apparatus of any one of examples 1 to 5, including or excluding optional features. In this example, the curved lens array and the curved screen include a spherical curvature curved in two dimensions to reduce off-axis aberrations.

Example 7 includes the apparatus of any one of examples 1 to 6, including or excluding optional features. In this example, the curved screen and the curved lens array are mechanically paired for changing the lens array-to-display spacing while preserving concentricity.

Example 8 includes the apparatus of any one of examples 1 to 7, including or excluding optional features. In this example, both the curved lens array and the curved screen are mechanically flexible.

Example 9 includes the apparatus of any one of examples 1 to 8, including or excluding optional features. In this example, the curved lens array includes a planar surface that has been flexed or thermo-formed into a curved design.

Example 10 includes the apparatus of any one of examples 1 to 9, including or excluding optional features. In this example, the curved lens array is replaceable.

Example 11 includes the apparatus of any one of examples 1 to 10, including or excluding optional features. In this example, a lens of the curved lens array is electrically focus-tunable or dynamically switchable.

Example 12 includes the apparatus of any one of examples 1 to 11, including or excluding optional features. In this example, the apparatus includes a viewing zone with a box width based on a distance from an eye rotation center.

Example 13 includes the apparatus of any one of examples 1 to 12, including or excluding optional features. In this example, the apparatus includes an eye position tracker to track the position of eyes of a user and a viewing zone including a box width at each pupil based on a distance from an eye rotation center or an error of margin of the eye position tracker.

Example 14 includes the apparatus of any one of examples 1 to 13, including or excluding optional features. In this example, the apparatus includes an eye relief limit that is based on a shape of a viewing zone of the apparatus.

Example 15 includes the apparatus of any one of examples 1 to 14, including or excluding optional features. In this example, the curved screen includes an organic light emitting diode (OLED) display.

Example 16 is a method for generating elemental images. The method includes receiving, via a processor, an image to be presented and a virtual distance from eyes of a viewer. The method also includes rendering, via the processor, a stereo view of the image for each of the eyes at a virtual surface located at the virtual distance. The method further includes mapping, via the processor, pixels for each stereo view from the virtual surface to elemental images of a per-eye display using a per-lens projection model. The method also further includes pre-warping, via the processor, the elemental images based on a per-lens distortion model to compensate for a lens distortion. The method includes sending, via the processor, the pre-warped elemental images to a head mounted display to be displayed.

Example 17 includes the method of example 16, including or excluding optional features. In this example, mapping the pixels is performed using a pixel shader.

Example 18 includes the method of any one of examples 16 to 17, including or excluding optional features. In this example, the virtual surface includes a plane.

Example 19 includes the method of any one of examples 16 to 18, including or excluding optional features. In this example, the virtual surface includes a cylindrical surface or a piecewise linear approximation of a cylindrical surface.

Example 20 includes the method of any one of examples 16 to 19, including or excluding optional features. In this example, mapping the pixels to the elemental images includes using a two ray casting operation.

Example 21 includes the method of any one of examples 16 to 20, including or excluding optional features. In this example, the method includes receiving eye tracking data, wherein rendering the stereo views or mapping the pixels includes using multi-resolution shading.

Example 22 includes the method of any one of examples 16 to 21, including or excluding optional features. In this example, the method includes receiving eye tracking data, wherein rendering the stereo views includes using foveated rendering.

Example 23 includes the method of any one of examples 16 to 22, including or excluding optional features. In this example, the method includes tracing rays for a plurality of eye parameters based on a design of the head mounted display and an eye model to generate a mapping between a screen of the head mounted display and a retina of each of the eyes and storing the mapping in a look-up table.

Example 24 includes the method of any one of examples 16 to 23, including or excluding optional features. In this example, the method includes estimating an eye parameter in real-time using an eye pupil tracker and retrieving a mapping from a look-up table based on the estimated eye parameter, wherein the mapping is used to generate the elemental images.

Example 25 includes the method of any one of examples 16 to 24, including or excluding optional features. In this example, the per-lens projection model includes a perspective projection of virtual image with a center of projection assigned to a particular individual lens.

Example 26 is at least one computer readable medium for generating elemental images having instructions stored therein that direct the processor to receive an image to be presented and a virtual distance from eyes of a viewer. The computer-readable medium also includes instructions that direct the processor to render a stereo view of the image for each of the eyes at a virtual surface located at the virtual distance. The computer-readable medium further includes instructions that direct the processor to map pixels for each stereo view from the virtual plane to elemental images of a per-eye display using a per-lens projection model. The computer-readable medium also further includes instructions that direct the processor to pre-warp the elemental images based on a per-lens distortion model to compensate for a lens distortion. The computer-readable medium further includes instructions that direct the processor to and send the pre-warped elemental images to a head mounted display to be displayed.

Example 27 includes the computer-readable medium of example 26, including or excluding optional features. In this example, the computer-readable medium includes instructions to map the pixels using a pixel shader.

Example 28 includes the computer-readable medium of any one of examples 26 to 27, including or excluding optional features. In this example, the virtual surface includes a plane.

Example 29 includes the computer-readable medium of any one of examples 26 to 28, including or excluding optional features. In this example, the virtual surface includes a cylindrical surface or a piecewise linear approximation of a cylindrical surface.

Example 30 includes the computer-readable medium of any one of examples 26 to 29, including or excluding optional features. In this example, the computer-readable medium includes instructions to map the pixels to the elemental images using a two ray casting operation.

Example 31 includes the computer-readable medium of any one of examples 26 to 30, including or excluding optional features. In this example, the computer-readable medium includes instructions to receiving eye tracking data, wherein rendering the stereo views or mapping the pixels includes using multi-resolution shading based on the eye tracking data.

Example 32 includes the computer-readable medium of any one of examples 26 to 31, including or excluding optional features. In this example, the computer-readable medium includes instructions to receive eye tracking data, wherein rendering the stereo views includes using foveated rendering based on the eye tracking data.

Example 33 includes the computer-readable medium of any one of examples 26 to 32, including or excluding optional features. In this example, the computer-readable medium includes instructions to trace rays for a plurality of eye parameters based on a design of the head mounted display and an eye model to generate a mapping between a screen of the head mounted display and a retina of each of the eyes and store the mapping in a look-up table.

Example 34 includes the computer-readable medium of any one of examples 26 to 33, including or excluding optional features. In this example, the computer-readable medium includes instructions to estimate an eye parameter in real-time using an eye pupil tracker and retrieve a mapping from a look-up table based on the estimated eye parameter, wherein the mapping is used to generate the elemental images.

Example 35 includes the computer-readable medium of any one of examples 26 to 34, including or excluding optional features. In this example, the per-lens projection model includes a perspective projection of virtual image with a center of projection assigned to a particular individual lens.

Example 36 is a system for displaying stereo elemental images. The system includes two coupled eyepieces. Each of the two eyepieces includes a curved screen to display a plurality of elemental images. Each of the two eyepieces includes a curved lens array concentrically displaced in front of the curved screen to magnify the elemental images. Each of the plurality of elemental images is magnified by a different lens in the curved lens array.

Example 37 includes the system of example 36, including or excluding optional features. In this example, the curved lens array includes a lens array pitch and a display spacing based on a target perceived resolution, a target field of view, a target total thickness, and a display pixel pitch.

Example 38 includes the system of any one of examples 36 to 37, including or excluding optional features. In this example, the curved lens array includes a heterogeneous array of freeform lenses.

Example 39 includes the system of any one of examples 36 to 38, including or excluding optional features. In this example, the curved lens array includes a flat section, a cylindrically curved section, or any combination thereof.

Example 40 includes the system of any one of examples 36 to 39, including or excluding optional features. In this example, the curved lens array includes a patterned design, wherein principal planes of lenses of the patterned design are replicated along an arc of a curvature radius based on an eyeball radius, an eye relief, and a lens thickness.

Example 41 includes the system of any one of examples 36 to 40, including or excluding optional features. In this example, the curved lens array and the curved screen include a spherical curvature curved in two dimensions to reduce off-axis aberrations.

Example 42 includes the system of any one of examples 36 to 41, including or excluding optional features. In this example, the curved screen and the curved lens array are mechanically paired for changing the lens array-to-display spacing while preserving concentricity.

Example 43 includes the system of any one of examples 36 to 42, including or excluding optional features. In this example, both the curved lens array and the curved screen are mechanically flexible.

Example 44 includes the system of any one of examples 36 to 43, including or excluding optional features. In this example, the curved lens array includes a planar surface that has been flexed or thermo-formed into a curved design.

Example 45 includes the system of any one of examples 36 to 44, including or excluding optional features. In this example, the curved lens array is replaceable.

Example 46 includes the system of any one of examples 36 to 45, including or excluding optional features. In this example, a lens of the curved lens array is electrically focus-tunable or dynamically switchable.

Example 47 includes the system of any one of examples 36 to 46, including or excluding optional features. In this example, the system includes a viewing zone with a box width based on a distance from an eye rotation center.

Example 48 includes the system of any one of examples 36 to 47, including or excluding optional features. In this example, the system includes an eye position tracker to track the position of eyes of a user and a viewing zone including a box width at each pupil based on a distance from an eye rotation center or an error of margin of the eye position tracker.

Example 49 includes the system of any one of examples 36 to 48, including or excluding optional features. In this example, the system includes an eye relief limit that is based on a shape of a viewing zone of the apparatus.

Example 50 includes the system of any one of examples 36 to 49, including or excluding optional features. In this example, the curved screen includes an organic light emitting diode (OLED) display.

Example 51 is a system for displaying stereo elemental images. The system includes two coupled eyepieces. Each of the two eyepieces includes means for displaying a plurality of elemental images. Each of the two eyepieces includes means for magnifying the elemental images. The means for magnifying the elemental images is concentrically displaced in front of the means for displaying a plurality of elemental images. Each of the plurality of elemental images is magnified by a different lens in the means for displaying the plurality of elemental images.

Example 52 includes the system of example 51, including or excluding optional features. In this example, the means for magnifying the elemental images includes a lens array pitch and a display spacing based on a target perceived resolution, a target field of view, a target total thickness, and a display pixel pitch.

Example 53 includes the system of any one of examples 51 to 52, including or excluding optional features. In this example, the means for magnifying the elemental images includes a heterogeneous array of freeform lenses.

Example 54 includes the system of any one of examples 51 to 53, including or excluding optional features. In this example, the means for magnifying the elemental images includes a flat section, a cylindrically curved section, or any combination thereof.

Example 55 includes the system of any one of examples 51 to 54, including or excluding optional features. In this example, the means for magnifying the elemental images includes a patterned design, wherein principal planes of lenses of the patterned design are replicated along an arc of a curvature radius based on an eyeball radius, an eye relief, and a lens thickness.

Example 56 includes the system of any one of examples 51 to 55, including or excluding optional features. In this example, the means for magnifying the elemental images and the means for displaying the plurality of elemental images include a spherical curvature curved in two dimensions to reduce off-axis aberrations.

Example 57 includes the system of any one of examples 51 to 56, including or excluding optional features. In this example, the means for displaying the plurality of elemental images and the means for magnifying the elemental images are mechanically paired for changing the lens array-to-display spacing while preserving concentricity.

Example 58 includes the system of any one of examples 51 to 57, including or excluding optional features. In this example, both the means for magnifying the elemental images and the means for displaying the plurality of elemental images are mechanically flexible.

Example 59 includes the system of any one of examples 51 to 58, including or excluding optional features. In this example, the means for magnifying the elemental images includes a planar surface that has been flexed or thermo-formed into a curved design.

Example 60 includes the system of any one of examples 51 to 59, including or excluding optional features. In this example, the means for magnifying the elemental images is replaceable.

Example 61 includes the system of any one of examples 51 to 60, including or excluding optional features. In this example, the means for magnifying the elemental images is electrically focus-tunable or dynamically switchable.

Example 62 includes the system of any one of examples 51 to 61, including or excluding optional features. In this example, the system includes a viewing zone with a box width based on a distance from an eye rotation center.

Example 63 includes the system of any one of examples 51 to 62, including or excluding optional features. In this example, the system includes means for tracking the position of eyes of a user and a viewing zone including a box width at each pupil based on a distance from an eye rotation center or an error of margin of the means for tracking the position of eyes.

Example 64 includes the system of any one of examples 51 to 63, including or excluding optional features. In this example, the system includes an eye relief limit that is based on a shape of a viewing zone of the apparatus.

Example 65 includes the system of any one of examples 51 to 64, including or excluding optional features. In this example, the means for displaying the plurality of elemental images includes an organic light emitting diode (OLED) display.

Not all components, features, structures, characteristics, etc. described and illustrated herein need be included in a particular aspect or aspects. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some aspects have been described in reference to particular implementations, other implementations are possible according to some aspects. Additionally, the arrangement and/or order of circuit elements or other features illustrated in the drawings and/or described herein need not be arranged in the particular way illustrated and described. Many other arrangements are possible according to some aspects.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more aspects. For instance, all optional features of the computing device described above may also be implemented with respect to either of the methods or the computer-readable medium described herein. Furthermore, although flow diagrams and/or state diagrams may have been used herein to describe aspects, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. An apparatus for displaying stereo elemental images, comprising:
   two coupled eyepieces, each of the two eyepieces including:

a curved screen to display a plurality of elemental images; and a curved lens array concentrically displaced in front of the curved screen to magnify the elemental images, wherein each of the plurality of elemental images is magnified by a different lens in the curved lens array, wherein the curved lens array includes a dynamic or switchable lens array to vary a virtual image distance, and wherein each of the elemental images are mapped for each of a stereo view from a virtual surface of pixels by:

selecting a projection center, for each elemental image, from a range of locations along a line extending through an eye center and a lens center of the different lens in the curved lens array that magnifies the corresponding elemental image;

finding a first projection of each pixel of each elemental image onto a corresponding virtual image pixel of one of a plurality of curved virtual images, the first projection to pass through the lens center of the different lens that magnifies the corresponding elemental image; and finding a second projection of each virtual image pixel associated with each first projection of each pixel of each elemental image, the second projection to pass through the projection center onto one of a plurality of virtual image planes at different virtual distances.

2. The apparatus of claim 1, wherein the curved lens array includes a lens array pitch and a display spacing optimized for a target perceived resolution, a target field of view, and a target total thickness, given an existing display pixel pitch.

3. The apparatus of claim 1, wherein the curved lens array includes a heterogeneous array of freeform lenses.

4. The apparatus of claim 1, wherein the curved lens array includes a flat section, a cylindrically curved section, or any combination thereof.

5. The apparatus of claim 1, wherein the curved lens array includes a patterned design, wherein principal planes of lenses of the patterned design are replicated along an arc of a curvature radius based on an eyeball radius, an eye relief, and a lens thickness.

6. The apparatus of claim 1, wherein the curved lens array and the curved screen include a spherical curvature curved in two dimensions to reduce off-axis aberrations.

7. The apparatus of claim 1, wherein the curved screen and the curved lens array are mechanically paired to change a lens array-to-display spacing while preserving concentricity.

8. The apparatus of claim 1, wherein both the curved lens array and the curved screen include mechanically flexible surfaces.

9. The apparatus of claim 1, wherein the curved lens array includes a planar surface that has been flexed or thermoformed into a curved design.

10. The apparatus of claim 1, wherein the curved lens array is replaceable.

11. The apparatus of claim 1, wherein a lens of the curved lens array is electrically focus-tunable or dynamically switchable.

12. The apparatus of claim 1, further including a viewing zone with a box width based on a distance from an eye rotation center.

13. The apparatus of claim 1, further including an eye position tracker to track a position of an eye of a user and a viewing zone including a box width at each pupil based on a distance from an eye rotation center or an error of margin of the eye position tracker.

14. The apparatus of claim 1, further including an eye relief limit that is based on a shape of a viewing zone of the apparatus.

15. The apparatus of claim 1, wherein the curved screen includes an organic light emitting diode (OLED) display.

16. A method for generating elemental images, comprising:

obtaining, via a processor, an image to be presented and a virtual distance from eyes of a viewer;

rendering, via the processor, a stereo view of the image for each of the eyes at a virtual surface located at the virtual distance;

mapping, via the processor, pixels for each stereo view from the virtual surface to elemental images of a per-eye display using a per-lens projection model, wherein the mapping of the pixels for each stereo view from the virtual surface to the elemental images includes:

selecting a projection center, for a first elemental image of the elemental images, from a range of locations along a line extending through an eye center and a lens center of a first lens in a lens array, the first lens associated with the first elemental image;

finding a first projection of each pixel of the first elemental image onto a corresponding virtual image pixel of one of a plurality of curved virtual images, the first projection to pass through the lens center of the first lens that magnifies the first elemental image; and finding a second projection of each virtual image pixel associated with each first projection of each pixel of the first elemental image, the second projection to pass through the projection center onto one of a plurality of virtual image planes at different virtual distances;

pre-warping, via the processor, the elemental images based on a per-lens distortion model to compensate for a lens distortion; and sending, via the processor, the pre-warped elemental images to a head mounted display to be displayed.

17. The method of claim 16, wherein the mapping of the pixels is performed using a pixel shader.

18. The method of claim 16, wherein the virtual surface includes a plane.

19. The method of claim 16, wherein the virtual surface includes a cylindrical surface or a piecewise linear approximation of a cylindrical surface.

20. The method of claim 16, further including receiving eye tracking data, wherein the rendering of the stereo views or the mapping of the pixels includes using multi-resolution shading.

21. The method of claim 16, further including receiving eye tracking data, wherein the rendering of the stereo views includes using foveated rendering.

22. The method of claim 16, further including tracing rays for a plurality of eye parameters based on a design of the head mounted display and an eye model to generate a mapping between a screen of the head mounted display and a retina of each of the eyes and storing the mapping in a look-up table.

23. At least one non-transitory computer readable medium comprising instructions that, in response to being executed on a computing device, cause the computing device to:

obtain an image to be presented and a virtual distance from eyes of a viewer;

render a stereo view of the image for each of the eyes at a virtual surface located at the virtual distance;

map pixels for each stereo view from the virtual surface to elemental images of a per-eye display using a per-lens projection model, wherein, to map the pixels for each stereo view, the computing device is to:

select a projection center, for a first elemental image of the elemental image, from a range of locations along a line extending through an eye center and a lens center of a first lens in a lens array, the first lens associated with the first elemental image;

find a first projection of each pixel of the first elemental image onto a corresponding virtual image pixel of one of a plurality of curved virtual images, the first projection to pass through the lens center of the first lens that magnifies the first elemental image; and find a second projection of each virtual image pixel associated with each first projection of each pixel of the first elemental image, the second projection to pass through the projection center onto one of a plurality of virtual image planes at different virtual distances;

pre-warp the elemental images based on a per-lens distortion model to compensate for a lens distortion; and send the pre-warped elemental images to a head mounted display to be displayed.

24. The at least one non-transitory computer readable medium of claim 23, wherein the instructions cause the computing device to estimate an eye parameter in real-time using an eye pupil tracker and retrieve a mapping from a look-up table based on the estimated eye parameter, wherein the mapping is used to generate the elemental images.

25. The method of claim 16, wherein the mapping of the pixels for each stereo view from the virtual surface to the elemental images further includes fetching a color point from a virtual image plane and setting the color point as an elemental image pixel.

* * * * *

UNITED STATES PATENT AND TRADEMARK OFFICE
CERTIFICATE OF CORRECTION

| | |
|---|---|
| PATENT NO. | : 10,948,740 B2 |
| APPLICATION NO. | : 15/708750 |
| DATED | : March 16, 2021 |
| INVENTOR(S) | : Ratcliff et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 37 days.

Signed and Sealed this
Thirty-first Day of January, 2023

*Katherine Kelly Vidal*

Katherine Kelly Vidal
*Director of the United States Patent and Trademark Office*